(12) United States Patent
Fujimoto et al.

(10) Patent No.: US 8,027,126 B2
(45) Date of Patent: Sep. 27, 2011

(54) MAGNETIC HEAD SUSPENSION

(75) Inventors: Yasuo Fujimoto, Kyoto-fu (JP); Satoru Takasugi, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 429 days.

(21) Appl. No.: 12/358,740

(22) Filed: Jan. 23, 2009

(65) Prior Publication Data

US 2009/0190261 A1 Jul. 30, 2009

(30) Foreign Application Priority Data

Jan. 25, 2008 (JP) .................. 2008-014751

(51) Int. Cl.
*G11B 5/48* (2006.01)

(52) U.S. Cl. ............. 360/244.2; 360/245.3; 360/244.6; G9B/5.147

(58) Field of Classification Search .......... None
See application file for complete search history.

(56) References Cited

U.S. PATENT DOCUMENTS

2002/0006014 A1* 1/2002 Heist et al. ............. 360/244.6
2003/0193752 A1* 10/2003 Takahashi et al. ......... 360/245.3

FOREIGN PATENT DOCUMENTS

| JP | 09-82052 | 3/1997 |
| JP | 11-39808 | 2/1999 |
| JP | 2004-348804 | 12/2004 |
| JP | 2005-174506 | 6/2005 |

* cited by examiner

*Primary Examiner* — Huan Hoang
*Assistant Examiner* — James G Norman
(74) *Attorney, Agent, or Firm* — Sterne, Kessler, Goldstein & Fox P.L.L.C.

(57) ABSTRACT

A load bending part includes a pair of first elastic plate parts and a second elastic plate part. The pair of first elastic plate parts are elastically deformed in a bended manner so as to generate a first pressing load. The second elastic plate part is positioned between the pair of first elastic plate parts in the suspension widthwise direction in a state of having both ends in its longitudinal direction connected to a pair of support pieces of a supporting part, and are elastically deformed in a twisted manner around a twist axis line along the suspension widthwise direction so as to generate a second pressing load. The total of the first and second pressing loads functions as a load for pressing the magnetic head slider toward the disk surface against air pressure due to rotation of a disk surface.

20 Claims, 32 Drawing Sheets

Fig. 5
(a) 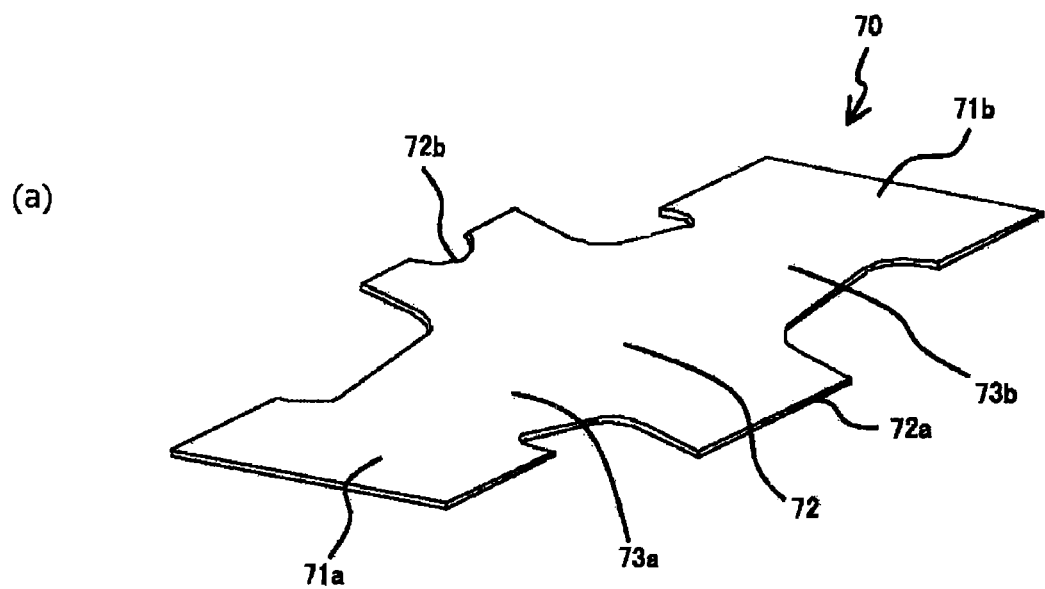
(b) 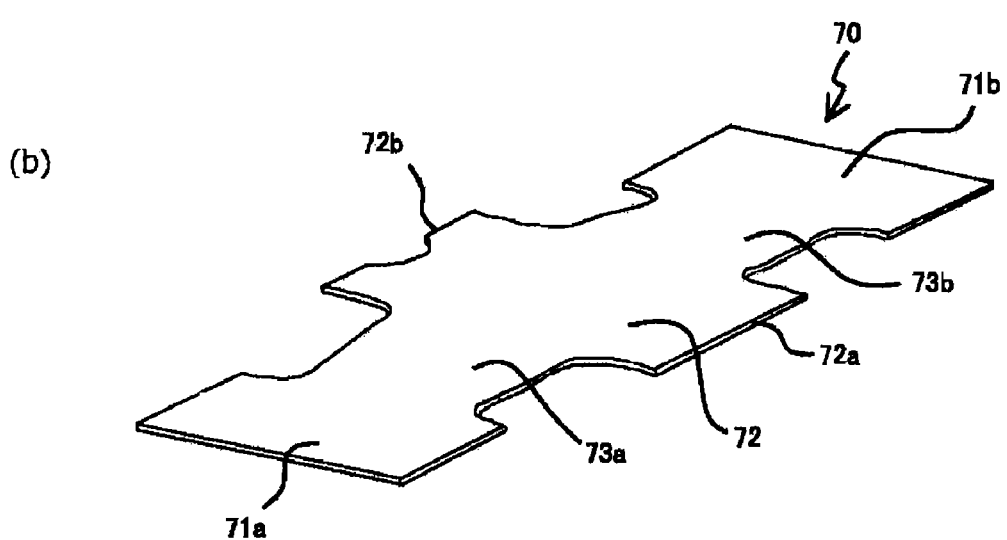

MAGNETIC HEAD SUSPENSION

BACKGROUND OF THE INVENTION

1. Field of the Invention

The present invention relates to a magnetic head suspension for supporting a magnetic head slider that reads and/or writes data from/to a recording medium such as a hard disk device.

2. Related Art

A magnetic head suspension for supporting a magnetic head slider is required to move the magnetic head slider with high accuracy to a desired track of a recording medium such as a hard disk device (improvement in positioning accuracy), as well as to be highly impact-resistant in a state where the magnetic head suspension is in an operating condition in which the magnetic head slider is positioned above the recording medium (improvement in impact resistance).

In order to realize the improvement in positioning accuracy, the magnetic head suspension is required to be resistant to have a vibration that causes the magnetic head slider to displace from the desired track. In particular, it is crucial to raise a resonant frequency in a sway mode that is a main resonance mode.

For example, it is possible to raise the resonant frequency in the sway mode by increasing a thickness of a load beam part, which serves as one of components of the magnetic head suspension, so as to increase rigidity of the load beam part in an off track direction.

It is also possible to increase rigidity of the load beam part in the off track direction by increasing a width of a proximal end of the load beam part so as to increase a distance between support points at which the load beam part is supported.

Specifically, the magnetic head suspension includes a load bending part that generates a load for pressing the magnetic head slider toward a disk surface, the load beam part that transfers the load to the magnetic head slider, a supporting part such as an arm that supports the load beam part with the load bending part interposed therebetween, and a flexure part that is joined to the load beam part and that supports the magnetic head slider.

In general, the load bending part is formed of an elastic plate that is elastically bendable in a z direction orthogonal to the disk surface of the recording medium.

More specifically, the elastic plate has a proximal end connected to the supporting part and a free end connected to the proximal end of the load beam part, so that the load beam part is supported by the elastic plate in a cantilevered manner.

In this configuration, it is possible to increase rigidity of the load beam part in the off track direction by increasing the width of the proximal end of the load beam part so as to increase the distance in a suspension widthwise direction between the support points at which the load beam part is supported by the load bending part (connecting points between the load beam part and the free end of the elastic plate).

However, both of increase in thickness of the load beam part and increase in width of the proximal end of the load beam part result in increase in weight thereof, which adversely affects impact resistance of the magnetic head suspension.

Specifically, improvement in impact resistance requires that the magnetic head suspension is resistant to be displaced in the z direction orthogonal to the disk surface of the recording medium in a case where an extraneous impact force is applied to a data storage device that is mounted with the magnetic head suspension.

In particular, if an extraneous impact of not less than a predetermined force in a direction of moving the magnetic head slider apart from the disk surface is applied to the data storage device so that the magnetic head slider is moved apart from the disk surface (jumping action), the magnetic head slider may swing back from the jumping action to hit and damage the disk surface.

Impact resistance can be effectively improved by reducing the thickness and/or the width of the load beam part and thereby reducing the weight thereof, so as to reduce an inertial force that is applied to the load beam part upon application of an impact force. Impact resistance is rather deteriorated by increase in thickness and/or width of the load beam part for a purpose of raising the resonant frequency of the magnetic head suspension.

There are proposed some configurations for improving impact resistance of the magnetic head suspension with the thickness and/or the width of the load beam part being unchanged. Namely, Japanese Unexamined Patent Publication No. 2004-348804 discloses a configuration (hereinafter, referred to as a first conventional configuration) in which a component forming the load beam part is provided with a proximal-end-side extended region that is extended beyond the load bending part toward the proximal end side. Further, Japanese Unexamined Patent Publications Nos. 09-082052 and 11-039808 each disclose a configuration (hereinafter, referred to as a second conventional configuration) in which the proximal end of the load beam part is provided with an equilibrating weight.

In the first and second conventional configurations, the proximal-end-side extended region and/or the equilibrating weight equilibrate(s) as much as possible the weight on the distal end side and the weight on the proximal end side of the magnetic head suspension with the load bending part as a reference, so that the magnetic head slider is inhibited from jumping upon application of an extraneous impact force. These configurations are useful in that they do not deteriorate rigidity of the load beam part.

However, in the first and second conventional configurations, the load beam part is joined to the free end of the load bending part that is supported by the supporting part in a cantilevered manner. In this configuration, the support points at which the load beam part is supported (joining points between the load beam part and the load bending part) are dramatically displaced in the z direction orthogonal to the disk surface upon application of an impact force.

Therefore, the magnetic head suspension according to each of the first and second conventional configurations does not deteriorate rigidity of the load beam part, but does not adequately improve impact resistance thereof.

SUMMARY OF THE INVENTION

The present invention is made in view of the conventional techniques and aims to provide a magnetic head suspension capable of realizing both of improvement of impact resistance and raise of resonant frequency.

The present invention provide, in order to achieve the aim, a magnetic head suspension including a load bending part that generates a load for pressing a magnetic head slider toward a disk surface, a load beam part that transmits the load to the magnetic head slider, a supporting part that supports the load beam part through the load bending portion and that includes a main body region and a pair of support pieces extended from both ends of the main body region in a suspension widthwise direction toward a distal end side of the suspension so as to define a concave part therebetween opened toward the distal end side of the suspension at a center in the suspension width direction, a flexure part that is joined to the load beam part and that supports the magnetic head slider, and an equilibrating weight part that is connected to the load beam part so as to have a proximal end located within the concave part in planar view and that forms, together with the load beam part, the flexure part and the magnetic head slider, an assembly supported by the supporting part through the load bending part, wherein (a) there is provided a pair of first elastic plate parts disposed symmetrically with each other with a longitudinal center line of the suspension as a reference and a second elastic plate part disposed symmetrically with the longitudinal center line as a reference, the pair of first elastic plate parts and the second elastic plate part functioning as the load bending part, (b) the pair of first elastic plate parts have proximal ends connected to the pair of support pieces and free ends connected to the assembly in a state of having plate surfaces substantially in parallel with the disk surface, the pair of first elastic plate parts being elastically deformed in a bended manner so as to generate a first pressing load that presses the magnetic head slider toward the disk surface against air pressure due to rotation of the disk surface, (c) the second elastic plate part is positioned between the pair of first elastic plate parts in the suspension widthwise direction in a state of having its longitudinal direction along the suspension widthwise direction, (d) the second elastic plate part includes a pair of support piece connecting regions that are respectively connected to the pair of support pieces, an assembly connecting region that is positioned at a center of the second elastic plate part in its longitudinal direction and that is connected to the assembly, and a pair of extended regions that are extended between the support piece connecting regions and the assembly connecting region, the second elastic plate part generating a second pressing load that presses the magnetic head slider toward the disk surface against air pressure due to rotation of the disk surface as the pair of extended regions are elastically deformed in a twisted manner around a twist axis line along the suspension widthwise direction, and (e) the total of the first and second pressing loads functions as the load for pressing the magnetic head slider toward the disk surface.

The magnetic head suspension according to the present invention makes it possible to improve impact resistance while raising resonant frequency.

The pair of first elastic plate parts are preferably pre-bent at a position same as the twist axis line of the second elastic plate part in the suspension lengthwise direction in such a manner that the free ends are come closer to the disk surface relative to the proximal ends.

For example, the magnetic head suspension according to the present invention may include a single plate like load beam part component that integrally forms the load beam part, the pair of first elastic plate parts and the second elastic plate part. In the configuration, a region of the load beam part component that forms the load beam part is provided with flanges.

In one example, the magnetic head suspension further includes an equilibrating weight part component that forms the equilibrating weight part that is separate from the load beam part component. In the configuration, the equilibrating weight part component is joined by welding to the load beam part component in a state of having a distal end portion overlapped with the region of the load beam part component that forms the load beam part with respect to the suspension lengthwise direction.

In the one example, the equilibrating weight part component preferably includes, in the suspension lengthwise direction, a central portion joined to the second elastic plate part, the distal end portion extended from the central portion toward the distal end side of the suspension and joined to the load beam part component, and a proximal end portion that is extended from the central portion toward the proximal end side of the suspension. The distal end portion is joined to the load beam part component in a state of being positioned outwards than the central portion in the suspension widthwise direction and being overlapped with the load beam part in the suspension lengthwise direction.

Preferably, the distal end portion may include a pair of beams that are extended to right and left respectively from the center in the suspension widthwise direction.

More preferably, the pair of first elastic plate parts have the proximal ends connected to the pair of support pieces and the free ends connected to the pair of beams.

More preferably, the pair of beams have free ends extended outwards than the load beam part in the suspension widthwise direction. The free ends of the pair of first elastic plate parts are connected to regions of the pair of beams that are positioned outwards than the load beam part in the suspension widthwise direction.

In any one of the above various configurations, the supporting part may include a connecting piece that connects between the pair of support pieces.

The connecting piece includes a pair of arm regions that have proximal ends connected respectively to the pair of support pieces and distal ends located farther away from the disk surface relative to the proximal ends, and a bridge region that connects between the distal ends of the pair of arm regions.

For example, the bridge region connects between the pair of arm regions in a state of being overlapped in planar view with the twist axis line and being away from a rear surface of the assembly that is opposite from the disk surface in a direction orthogonal to the disk surface by a predetermined distance.

Alternatively, the bridge region connects between the pair of arm regions at a position overlapped in planar view with the twist axis line. The bridge region is brought into contact with a rear surface of the assembly that is opposite from the disk surface through a contact structure, the contact structure being located at a substantially identical position with the twist axis line in the suspension lengthwise direction and being formed symmetrically with the longitudinal center line of the suspension as a reference.

In one example, the supporting part is configured by a base plate that includes a boss part provided with a boss hole to be joined by swaging to a distal end of an arm of an E block.

The base plate includes a first plate member that integrally has a region corresponding to the main body region, the pair of support pieces and the connecting piece, and a boss member that forms the boss part.

The first plate member is formed with a first mounting hole having a diameter corresponding to an outer diameter of the boss member, and a slit communicating the concave part defined by the pair of support pieces with the first mounting hole.

The boss member is joined by welding to the first plate member in a state of being fitted into the first mounting hole.

The boss member preferably includes a main body part that is provided with the boss hole and has an outer diameter slightly smaller than the diameter of the first mounting hole, and a caulk piece that is extended radially outwards from the main body part and has an outer diameter slightly larger than the diameter of the first mounting hole. The boss member is fitted into the first mounting hole in a state where the caulk piece is caulked therein.

In the one example, preferably, the load beam part component may integrally include a supporting part configuring region corresponding to a region of the supporting part exclusive of the connecting piece, in addition to a region corresponding to the load beam part, a region corresponding to the pair of first elastic plate parts and a region corresponding to the second elastic plate part. The supporting part configuring region is provided with a second mounting hole having a diameter larger than that of the boss hole.

The first plate member is joined by welding to the rear surface of the load beam part component that is opposite from the disk surface in a state where the first mounting hole is positioned concentrically with the second mounting hole.

More preferably, the second mounting hole has a diameter smaller than the outer diameter of the boss member.

In the configuration, the boss member is fitted into the first mounting hole in a state where a part of its facing surface that faces the disk surface is in contact with the rear surface of the load beam part component that is opposite from the disk surface.

In one example, the magnetic head suspension according to the present invention may include a supporting part component that forms the supporting part, the supporting part component integrally including the main body region, the pair of support pieces and the connecting piece.

In the configuration, preferably, the pair of arm regions of the connecting piece are bent at the proximal ends and the distal ends around bending reference lines along the suspension widthwise direction, so that the bridge region is positioned on the side of the assembly that is opposite from the disk surface.

More preferably, the supporting part component may include first and second supporting part component plates that are layered and joined by welding to each other. The first supporting part component plate integrally includes a region corresponding to the main body region and a region corresponding to the pair of support pieces. The second supporting part component plate integrally includes a region corresponding to the main body region, a region corresponding to the pair of support pieces and a region corresponding to the connecting piece.

In one example, the supporting part may integrally include, in addition to the main body region and the pair of support pieces, a connecting piece that connects between the pair of support pieces.

The connecting piece includes a pair of arm regions that have proximal ends connected respectively to the pair of support pieces and distal ends extended from the proximal ends toward the distal end side of the suspension, and a bridge region that connects between distal ends of the pair of arm regions.

The pair of arm regions are bent around bending reference lines along the suspension widthwise direction so that the bridge region is positioned on the side of the assembly that is opposite from the disk surface.

In one example, the pair of support pieces may have a pair of first planar portions that are extended from the main body region to the distal end side of the suspension so as to be located in a plane identical with the main body region, a pair of second planar portions that are extended substantially in parallel with the disk surface at a position closer to the disk surface relative to the pair of first planar portions and that support the assembly through the pair of first elastic plates and the second elastic plate, and a pair of arm portions that connect between the pair of first planar portions and the pair of second planar portions.

In the configuration, the supporting part integrally includes, in addition to the main body region and the pair of support pieces, a connecting piece that connects between the pair of first planar portions on a side of the assembly that is opposite from disk surface.

In any one of the above various configurations, the pair of extended regions of the second elastic plate part have plate surfaces substantially in parallel with the disk surface.

Alternatively, the pair of extended regions of the second elastic plate part have plate surfaces substantially orthogonal to the disk surface.

BRIEF DESCRIPTION OF THE DRAWINGS

The above, and other objects, features and advantages of the present invention will become apparent from the detailed description thereof in conjunction with the accompanying drawings wherein.

FIGS. 5A and 5B are schematic perspective views of the second elastic plate part. FIG. 5A shows a state in which the second elastic plate part is pre-twisted, and FIG. 5B shows a state in which the second elastic plate is twisted back by the air pressure due to rotation of a disk surface.

DETAILED DESCRIPTION OF THE PREFERRED EMBODIMENTS

First Embodiment

Described below with reference to the accompanying drawings is a magnetic head suspension according to a preferred first embodiment of the present invention.

Figure 1:
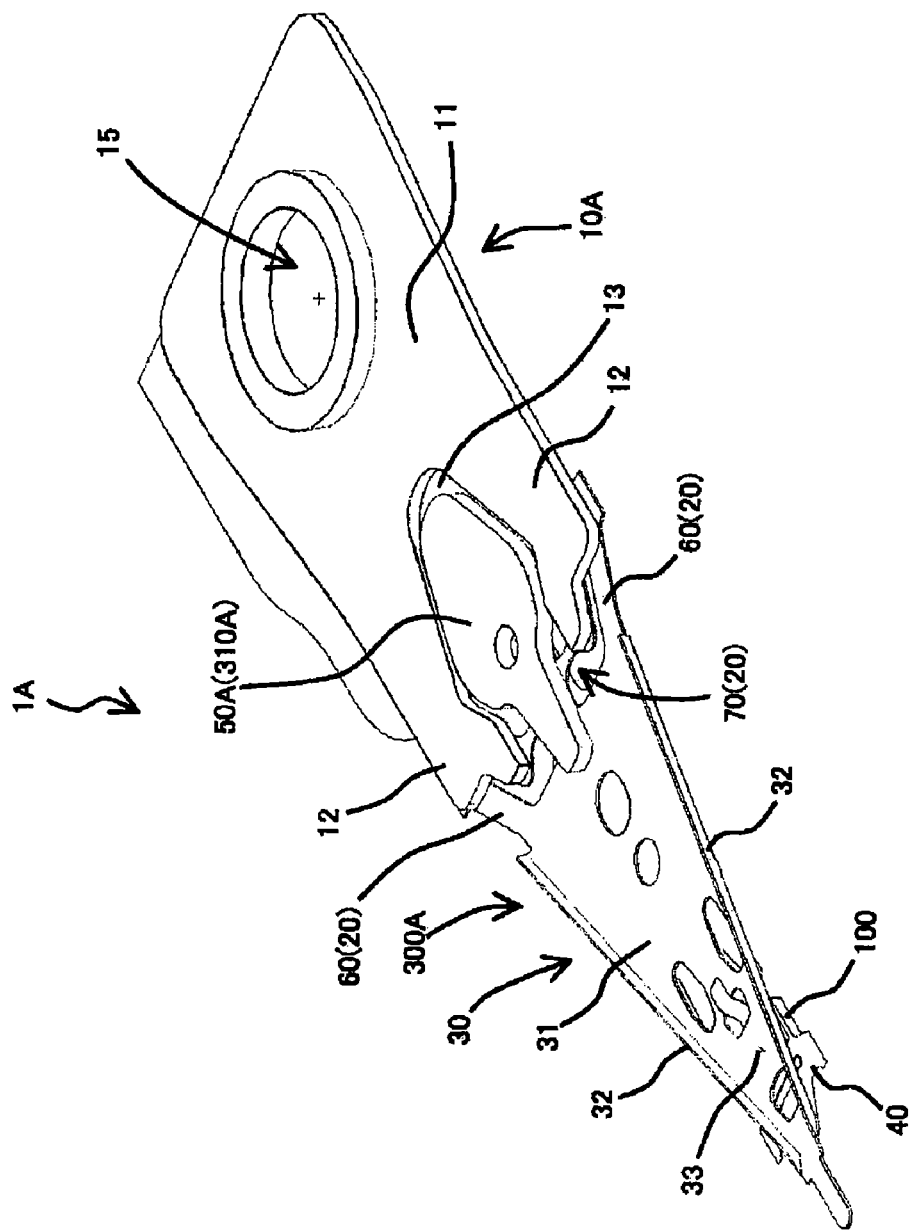
FIG. 1 is a perspective view of a magnetic head suspension according to a first embodiment of the present invention, as viewed from above.

FIG. 1 is a perspective view of a magnetic head suspension 1A according to the present embodiment, as viewed from above (from a side opposite from a disk surface).

FIGS. 2A and 2B are a top view (a plan view as viewed from the side opposite from the disk surface) and a bottom view (a bottom view as viewed from the side close to the disk surface) respectively, of the magnetic head suspension 1A according to the present embodiment. It is noted that small circles in FIG. 2B each indicate a welding point.

Figure 2:
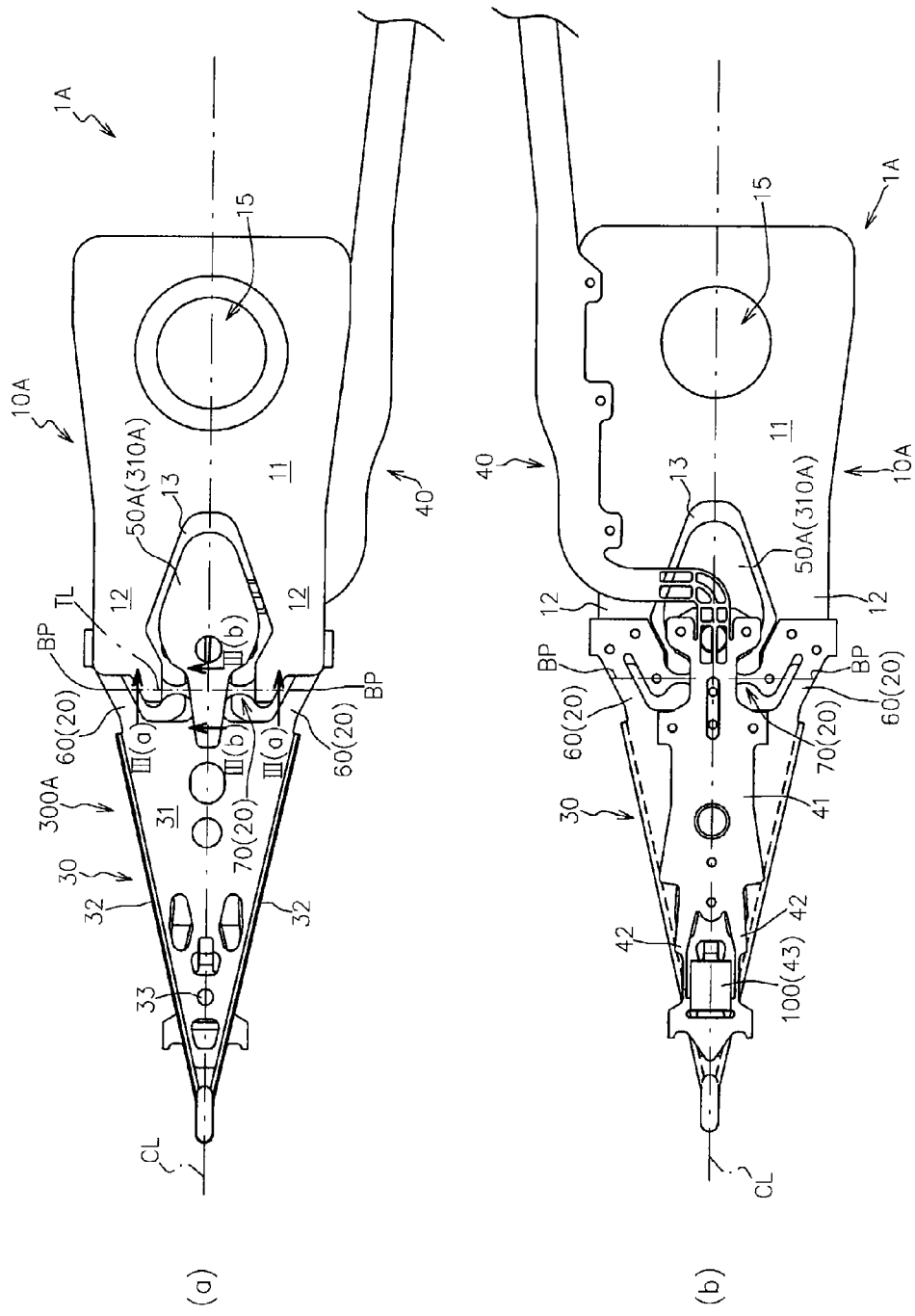
FIGS. 2A and 2B are a top view and a bottom view respectively, of the magnetic head suspension according to the first embodiment.
Figure 3:
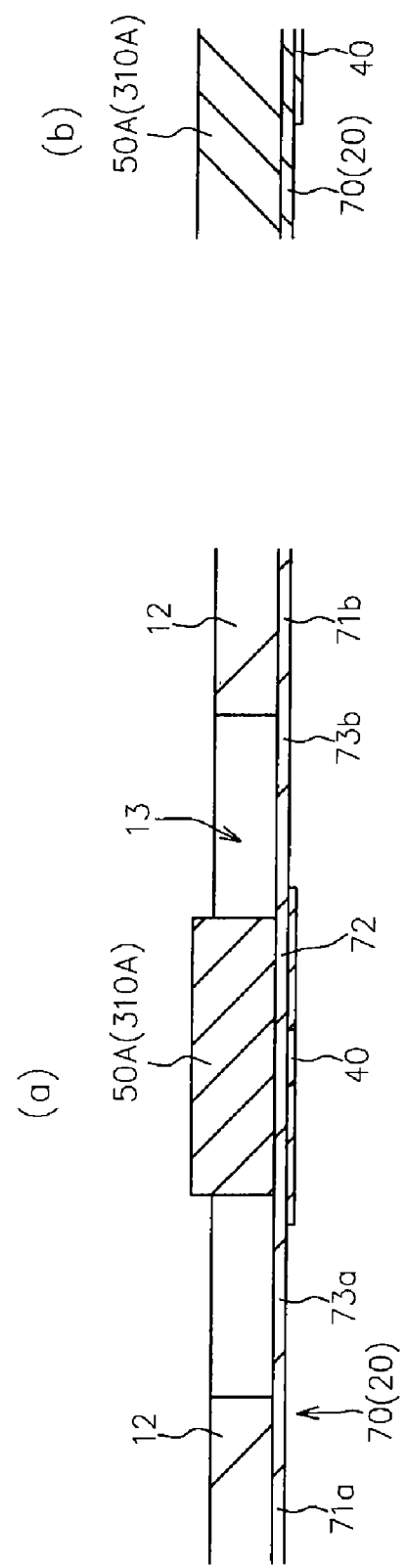
FIGS. 3A and 3B are cross sectional views respectively cut along Line III(a)-III(a) and Line III(b)-III(b) in FIG. 2A.

Further, FIGS. 3A and 3B are cross sectional views respectively cut along Line III(a)-III(a) and Line III(b)-III(b) that are indicated in FIG. 2A.

The magnetic head suspension 1A includes a load bending part 20 that generates a load for pressing a magnetic head slider 100 toward the disk surface, a load beam part 30 that transfers the load to the magnetic head slider 100, a supporting part 10A that supports, with the load bending part 20 interposed therebetween, an assembly including the load beam part 30, and a flexure part 40 that is joined to the load beam part 30 and that supports the magnetic head slider 100.

The supporting part 10A is a member that supports the assembly through the load bending part 20, and is made to have relatively high rigidity.

In the present embodiment, the supporting part 10A is embodied by a base plate including a boss part 15 joined by a swage processing to a distal end of a carriage arm, which is swung by an actuator. Alternatively, the supporting part 10A may be embodied by an arm that has a proximal end connected to a swing axis of the actuator (see FIGS. 12A and 12B to be described later).

The supporting part 10A may be preferably formed of a stainless plate having a thickness of 0.05 mm to 0.8 mm.

As shown in FIGS. 1, 2A, and 2B, in the present embodiment, the supporting part 10A has a pair of support pieces 12 that are extended from both ends in a suspension widthwise direction toward a distal end of the suspension 1A, so that there is formed in a center in the suspension widthwise direction a concave part 13 which is opened to the distal end of the suspension 1A.

More specifically, the supporting part 10A has a plate-like main body region 11 that has a proximal end connected directly or indirectly to the actuator, the pair of support pieces 12 that are extended from the both ends in the suspension widthwise direction of a distal end of the main body region 11 toward the distal end side of the suspension 1A, and the concave part 13 provided between the pair of support pieces 12.

As already described, the load beam part 30 is a member that transfers to the magnetic head slider 100 a load generated by the load bending part 20, and thus is required to have rigidity of a predetermined degree.

As shown in FIGS. 1, 2A, and 2B, in the present embodiment, the load beam part 30 has a plate-like main body part 31, and flanges 32 that are formed by bending at both edges of the main body part 31 in the suspension widthwise direction. The flanges 32 provide the load beam part 30 with rigidity.

The load beam part 30 may be preferably formed of a stainless plate having a thickness of 0.02 mm to 0.1 mm.

More specifically, the load beam part 30 is provided at a distal end thereof with a protrusion 33, which is a so-called dimple.

The protrusion 33 is raised toward the disk surface by approximately 0.05 mm to 0.1 mm. This protrusion 33 is in contact with a rear surface (a surface opposite from the disk surface) of a head mount region 43 of the flexure part 40, so that the load is transferred to the head mount region 43 of the flexure part 40 by way of the protrusion 33.

The flexure part 40 is joined to the load beam part 30 while supporting the magnetic head slider 100.

More specifically, as shown in FIG. 2B, the flexure part 40 has a main body region 41 that is joined, by welding or the like, to a facing surface (a surface facing the disk surface) of the load beam part 30, a pair of support pieces 42 that are extended from the main body region 41 toward the distal end side, and the head mount region 43 that is supported by the pair of support pieces 42.

The head mount region 43 supports the magnetic head slider 100 on a facing surface that faces the disk surface.

As already described, the protrusion 33 is in contact with the rear surface of the head mount region 43 so that the head mount region 43 could be swung in a roll direction as well as in a pitch direction with the protrusion 33 functioning as a fulcrum point.

The flexure part 40 is less rigid in comparison to the load beam part 30 so that the head mount region 43 is swingable in the roll direction as well as in the pitch direction.

The flexure part 40 may be preferably formed of a stainless plate having a thickness of approximately 0.01 mm to 0.025 mm.

The flexure part 40 may be further provided integrally with a wiring in form of a printed circuit that transmits a writing signal and/or a reading signal to/from the magnetic head slider 100.

As shown in FIGS. 1, 2, and 2B, the magnetic head suspension 1A further includes an equilibrating weight part 50A that is connected to the load beam part 30 so as to have a proximal end located within the concave part 13 in planar view. The equilibrating weight part 50A forms the assembly together with the load beam part 30, the flexure part 40, and the magnetic head slider 100, and the assembly is supported by the supporting part 10A through the load bending part 20.

The equilibrating weight part 50A may be preferably formed of a stainless plate having a thickness of 0.05 mm to 0.4 mm.

The equilibrating weight part 50A is a member for equilibrating the weight of a portion on the distal end side and the weight of a portion on the proximal end side of the assembly supported by the supporting part 10A through the load bending part 20, with the load bending part 20 as a reference, thereby improving impact resistance of the magnetic head suspension 1A.

More specifically, upon application of an extraneous impact force to a data storage device that is mounted with the magnetic head suspension 1A, the load bending part 20 is elastically deformed in accordance with the direction of the applied impact force as the load bending part 20 is less rigid in comparison to the remaining portions.

For example, considered is a case where there is applied with an impact force in such a direction that moves the magnetic head slider 100 apart from the disk surface (an impact force in a magnetic head jumping direction). In this case, this impact force in the magnetic head jumping direction generates a moment of inertia in a first direction about the load bending part 20 in the portion of the assembly that is positioned on the distal end side than the load bending part 20. On the other hand, the impact force in the magnetic head jumping direction generates a moment of inertia in a second direction about the load bending part 20 in the portion of the assembly that is positioned on the proximal end side than the load bending part 20.

Provision of the equilibrating weight part 50A enables equilibrating or approximating the moment of inertia in the second direction about the load bending part with the moment of inertia in the first direction about the load bending part. Accordingly, the assembly can be effectively inhibited from turning about the load bending part 20 upon application of an impact force.

In the present embodiment, the equilibrating weight part 50A is provided separately from a load beam part component 300A that forms the load beam part 30, and is connected by welding to the load beam part component 300A. Alternatively, the equilibrating weight part 50A may be formed integrally with the load beam part 30.

More specifically, the load beam part component 300A forming the load beam part 30 may have a central portion in the suspension widthwise direction that is extended beyond the load bending part 20 toward the proximal end side in a suspension lengthwise direction, the extended central portion functioning as the equilibrating weight part 50A.

As shown in FIGS. 1, 2A, and 2B, the magnetic head suspension 1A includes a pair of first elastic plate parts 60 and a second elastic plate part 70 that function as the load bending part 20.

The pair of first elastic plate parts 60 are disposed symmetrically with each other with a longitudinal center line CL of the magnetic head suspension 1A as a reference.

The pair of first elastic plate parts 60 have proximal ends connected to the pair of support pieces 12 and free ends connected to the assembly in a state of having plate surfaces substantially in parallel with the disk surface, so that the free ends could be deformed in a bending manner so as to come close to and/or move apart from the disk surface, thereby generating a first pressing load that presses the magnetic head slider 100 toward the disk surface against air pressure due to rotation of the disk.

Preferably, each of the pair of first elastic plate parts is pre-bent at a predetermined bent position BP between the proximal end and the free end such that the free end is brought closer to the disk surface relative to the proximal end.

In this configuration, in a state where the magnetic head suspension 1A is in an operating condition in which the magnetic head slider 100 is positioned above the rotating disk surface, the magnetic head slider 100 is floated above the disk surface by air pressure due to rotation of the disk so that the load beam part 30 bends back the pair of first elastic plate parts 60 which has been pre-bent, whereby the pair of first elastic plate parts 60 generating the first pressing load that presses the magnetic head slider 100 against the disk surface.

More specifically, retained elasticity of the pair of first elastic plate parts 60 that is generated by bent-back behavior (elastic deformation) thereof functions as the first pressing load that presses the magnetic head slider 100 against the disk surface. This first pressing load generated by the pair of first elastic plate parts 60 and a second pressing load, which is to be described later, generated by the second elastic plate part 70 are equilibrated with the air pressure that presses the magnetic head slider 100 so as to be moved apart from the disk surface, so that the magnetic head slider 100 is floated above the disk surface by a predetermined distance at the time when the magnetic head suspension 1A is in the operating condition.

Each of the pair of first elastic plate parts 60 may be preferably formed of a stainless plate having a thickness of 0.02 mm to 0.1 mm.

Figure 4:
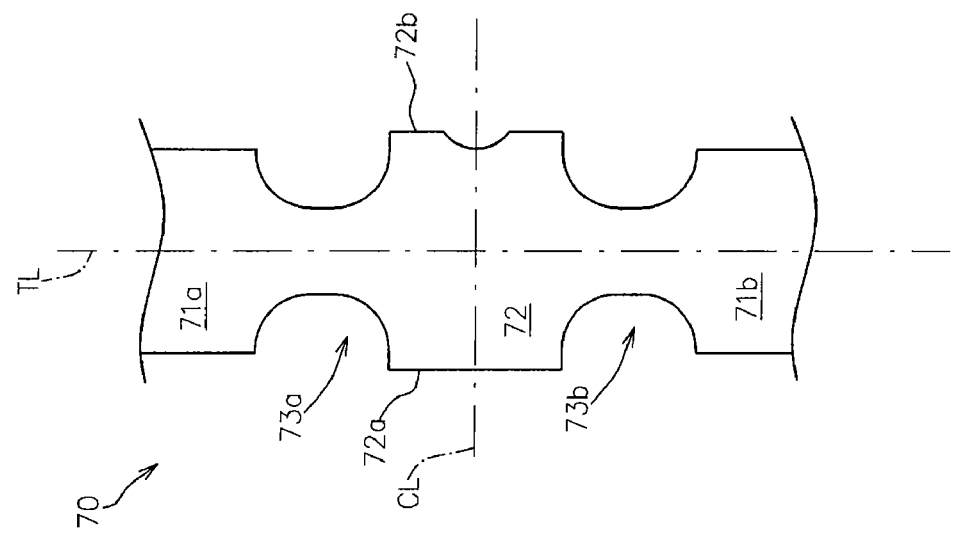
FIG. 4 is a plan view of a second elastic plate part of the magnetic head suspension according to the first embodiment.

FIG. 4 is a plan view of the second elastic plate part 70.

As shown in FIGS. 2A, 2B, and 4, the second elastic plate part 70 is disposed symmetrically with the longitudinal center line CL as a reference, and is positioned between the pair of first elastic plate parts 60 in the suspension widthwise direction in a state of having its longitudinal direction along the suspension widthwise direction.

More specifically, as shown in FIGS. 3A and 4, the second elastic plate part 70 is provided with a pair of support piece connecting regions 71a and 71b that are connected to the pair of support pieces 12 respectively, an assembly connecting region 72 that is positioned at a center of the second elastic plate part 70 in its longitudinal direction and that is connected to the assembly (the equilibrating weight part 50A in the assembly in the present embodiment), and a pair of extended regions 73a and 73b that are each extended between the support piece connecting region 71a or 71b and the assembly connecting region 72. When the pair of extended regions 73a and 73b are elastically twisted around a twist axis line TL along the suspension widthwise direction, the second elastic plate part 70 generates the second pressing load that presses the magnetic head slider 100 to the disk surface against air pressure due to rotation of the disk.

In other words, the second elastic plate part 70 is restricted as the pair of support piece connecting regions 71a and 71b are joined respectively to the pair of support pieces 12. Thus, when the magnetic head suspension 1A is in the operating condition so that the magnetic head slider 100 is floated above the disk surface by air pressure due to rotation of the disk, the pair of extended regions 73a and 73b are twisted around the twist axis line TL such that the distal end side of the assembly connecting region 72 is moved apart from the disk surface and the proximal end side thereof is brought closer to the disk surface. Retained elasticity of the second elastic plate part 70 that is generated by such elastic twisting behavior functions as the second pressing load.

The second elastic plate part 70 may be preferably formed of a stainless plate having a thickness of 0.02 mm to 0.1 mm.

The twist axis line TL of the second elastic plate part 70 and the bent positions BP of the pair of first elastic plate parts 60 can be preferably located at a substantially identical position in the suspension lengthwise direction.

Provision of the above-described configuration reasonably realizes elastic bending behavior of the pair of first elastic plate parts 60 and elastic twisting behavior of the second elastic plate part 70.

As shown in FIG. 4, in the present embodiment, the second elastic plate part 70 is shaped to be substantially symmetric with the longitudinal center line thereof as a reference. In this configuration, the longitudinal center line coincides with the twist axis line TL.

In this configuration, it is preferable to pre-bend the pair of first elastic plate parts 60 at a position identical to the longitudinal center line of the second elastic plate part 70 with respect to the suspension lengthwise direction, so that the bent positions BP of the pair of first elastic plate parts 60 and the twist axis line TL of the second elastic plate part 70 are located at an identical position in the suspension lengthwise direction.

More preferably, the pair of extended regions 73a and 73b of the second elastic plate part 70 are pre-twisted around the twist axis line TL such that a side edge 72a of the assembly connecting region 72 that is positioned on the distal end side in the suspension lengthwise direction (the side edge closer to the magnetic head slider 100) is brought closer to the disk surface in a state where the second elastic plate part 70 is not affected by air pressure due to rotation of the disk (i.e., in a state where the magnetic head suspension 1A is not in the operating condition). FIG. 5A is a schematic perspective view of the second elastic plate part 70 with the pair of extended regions 73a and 73b being pre-twisted.

In this configuration, when the magnetic head suspension 1A is in the operating condition and the magnetic head slider 100 is floated above the disk surface by air pressure due to rotation of the disk, the load beam part 30 twists back the pair of extended regions 73a and 73b of the second elastic plate part 70 so that the second elastic plate part 70 generates the second pressing load that presses the magnetic head slider 100 against the disk surface. FIG. 5B is a schematic perspective view of the second elastic plate part 70 with the pair of extended regions 73a and 73b being twisted back by the air pressure.

In other words, elasticity that is generated by twisting back behavior (elastic deformation) of the second elastic plate part 70 and that is retained by the second elastic plate part 70 functions as the second pressing load that presses the magnetic head slider 100 against the disk surface. Further, the total of the second pressing load by the second elastic plate part 70 and the first pressing load by the pair of first elastic plate parts 60 is equilibrated with the air pressure that presses the magnetic head slider 100 so as to be moved apart from the disk surface. As a result, the magnetic head slider 100 is floated above the disk surface by a predetermined distance when the magnetic head suspension 1A is in the operating condition.

As described above, in the magnetic head suspension 1A according to the present embodiment, the load bending part 20 includes not only the pair of first elastic plate parts 60 that are elastically bent to generate the first pressing load, but also the second elastic plate part 70 that is positioned between the pair of first elastic plate parts 60 in the suspension widthwise direction and that is elastically twisted to generate the second pressing load. This configuration realizes both a rise in resonant frequency and improvement in impact resistance of the magnetic head suspension 1A.

More specifically, provision of the pair of first elastic plate parts 60 makes it possible to increase as much as possible the width (the distance in the suspension widthwise direction) between the support points at which the assembly is supported (the points at which the assembly is supported by the load bending part 20). Accordingly, it is possible to increase rigidity of the assembly in an off track direction (in parallel with the disk surface), and to raise the resonant frequency of the magnetic head suspension 1A particularly in a sway mode.

In addition, the second elastic plate part 70, which has first and second ends in its longitudinal direction being supported respectively by the pair of support pieces 12 of the supporting part 10A, functions as the load bending part 20 in cooperation with the pair of first elastic plate parts 60.

Therefore, upon application of an extraneous impact force, it is possible to effectively inhibit displacement of the support points at which the assembly is supported (the joining points between the assembly and the load bending part 20) in the direction orthogonal to the disk surface, thereby dramatically increasing an acceleration (a critical acceleration) of the impact force that causes the magnetic head slider 100 to jump.

Specifically, in a case where the load bending part 20 includes only the cantilevered pair of first elastic plate parts 60 that each have the proximal end connected to the supporting part 10A and the free end supporting the assembly, the support points at which the assembly is supported are significantly displaced in the direction orthogonal to the disk surface upon application of an extraneous impact force. Such displacement is more significant in a case of increasing the width of the proximal end of the load beam part in order to increase rigidity of the assembly in the off track direction.

Thus, even if the equilibrating weight part 50A could equilibrate the weight on the distal end side of the assembly with the weight on the proximal end side thereof with the load bending part 20 as a reference, it is impossible to sufficiently inhibit jumping action of the magnetic head slider 100 upon application of an impact force.

On the contrary, the magnetic head suspension 1A according to the present embodiment includes, in addition to the pair of first elastic plate parts 60, the second elastic plate part 70 that is supported on the both ends thereof and that is elastically twisted to generate the second pressing load.

This configuration makes it possible to effectively prevent the support points at which the assembly is supported from being displaced in the direction orthogonal to the disk surface when an extraneous impact force is applied. Therefore, it is possible to dramatically increase the acceleration (the critical acceleration) of the impact force that causes the magnetic head slider 100 to jump, thereby improving impact resistance of the magnetic head suspension 1A.

The pair of first elastic plate parts 60 and the second elastic plate part 70 are all connected to the identical surfaces of the pair of support pieces 12.

In the present embodiment, the pair of first elastic plate parts 60 and the second elastic plate part 70 are connected to the facing surfaces of the pair of support pieces 12 that faces the disk surface.

In this configuration, the assembly is connected to the rear surfaces of the pair of first elastic plate parts 60 and the second elastic plate part 70 that are positioned on the side opposite from the disk surface.

As shown in FIGS. 1, 2A, and 2B, in the present embodiment, the pair of first elastic plate parts 60 and the second elastic plate part 70 are formed integrally by the single plate-like load beam part component 300A that forms the load beam part 30, and the equilibrating weight part 50A is configured by an equilibrating weight part component 310A that is provided separately from the load beam part component 300A.

The load beam part component 300A is connected to the facing surfaces of the pair of support pieces 12 that faces the disk surface. The equilibrating weight part component 310A has a longitudinal center portion welded to the rear surface of the second elastic plate part 70 that is opposite from the disk surface, and a distal end portion welded to the rear surface of the load beam part component 300A that is opposite from the disk surface.

In a case where the load beam part 30, the pair of first elastic plate parts 60, and the second elastic plate part 70 are configured by the single load beam part component 300A, the load beam part component 300A is formed to have a thickness appropriate for elastic deformation of the pair of first elastic plate parts 60 and the second elastic plate part 70, and rigidity of the load beam part 30 is secured by provision of the flanges 32 in the region forming the load beam part 30.

It is of course possible to alternatively form the pair of first elastic plate parts 60 and the second elastic plate part 70 separately from the load beam part 30.

In a case where the equilibrating weight part component 310A is provided separately from the load beam part component 300A that forms the load beam part 30 as in the present embodiment, the equilibrating weight part component 310A is preferably joined by welding to the load beam part component 300A in a state where the distal end thereof is overlapped with the region of the load beam part component 300A that forms the load beam part 30 with respect to the suspension lengthwise direction.

This configuration can effectively improve rigidity of the load beam part 30.

As already described, in the present embodiment, the load beam part 30 is configured integrally with the pair of first elastic plate parts 60 and the second elastic plate part 70 by the load beam part component 300A.

Accordingly, the equilibrating weight part component 310A is joined by welding to the load beam part component 300A in a state where the distal end thereof is overlapped with the region of the load beam part component 300A that includes the flanges 32 with respect to the suspension lengthwise direction.

Second Embodiment

Described below with reference to the accompanying drawings is a magnetic head suspension according to a second embodiment of the present invention.

Figure 6:
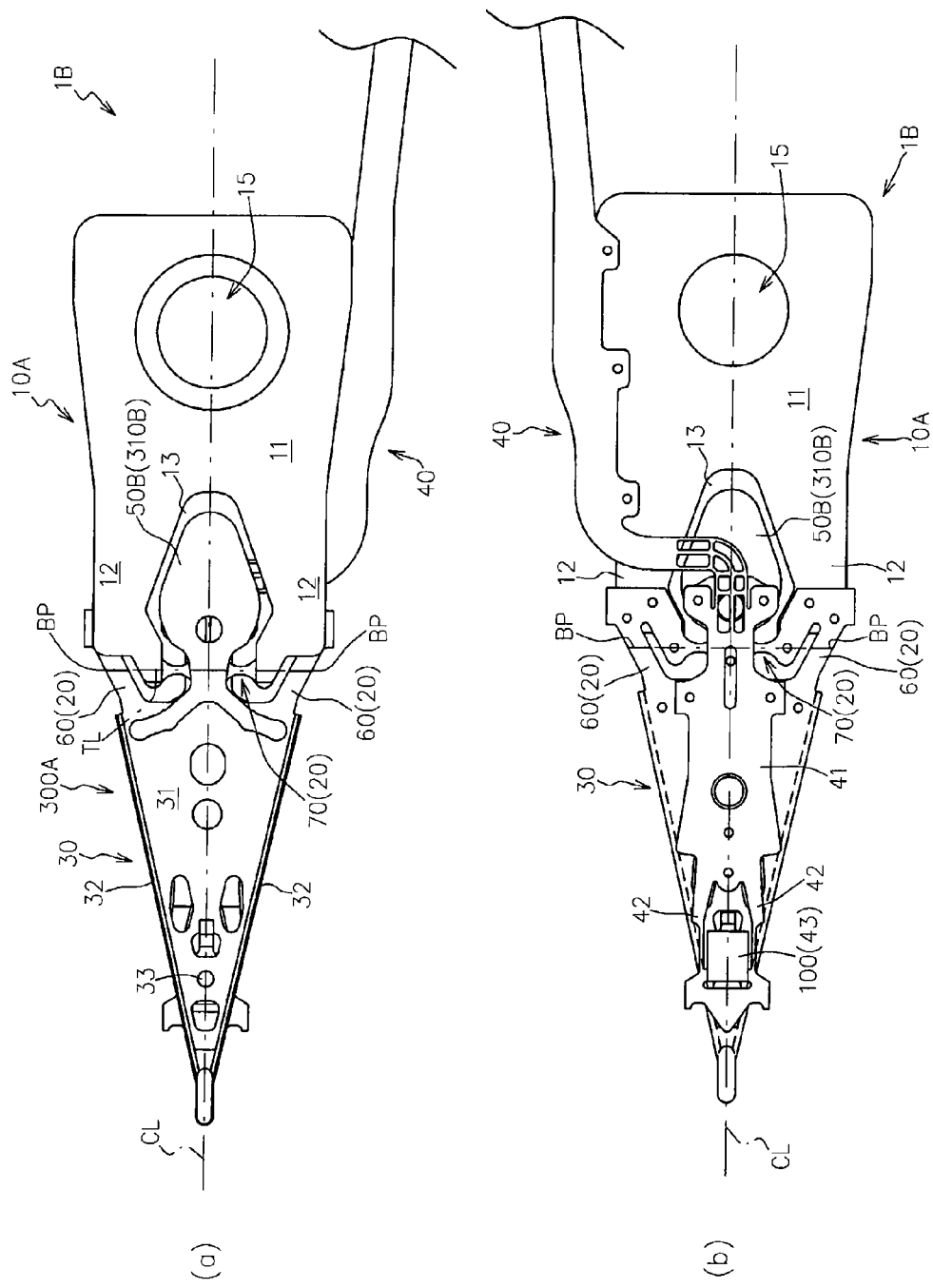
FIGS. 6A and 6B are a top view and a bottom view respectively, of a magnetic head suspension according to a second embodiment of the present invention.

FIGS. 6A and 6B are a top view (a plan view as viewed from the side opposite from the disk surface) and a bottom view (a bottom view as viewed from the side close to the disk surface) respectively, of a magnetic head suspension 1B according to the present embodiment. It is noted that small circles in FIG. 6B each indicate a welding point.

In the drawings, the components identical to those according to the first embodiment are denoted by the identical symbols, and detailed description thereof will not be repeated in the present embodiment.

The magnetic head suspension 1B according to the present embodiment is different from the magnetic head suspension 1A according to the first embodiment only in that the equilibrating weight part 50A is replaced with an equilibrating weight part 50B which is configured by an equilibrating weight part component 310B provided separately from the load beam part component 300A.

Figure 7:
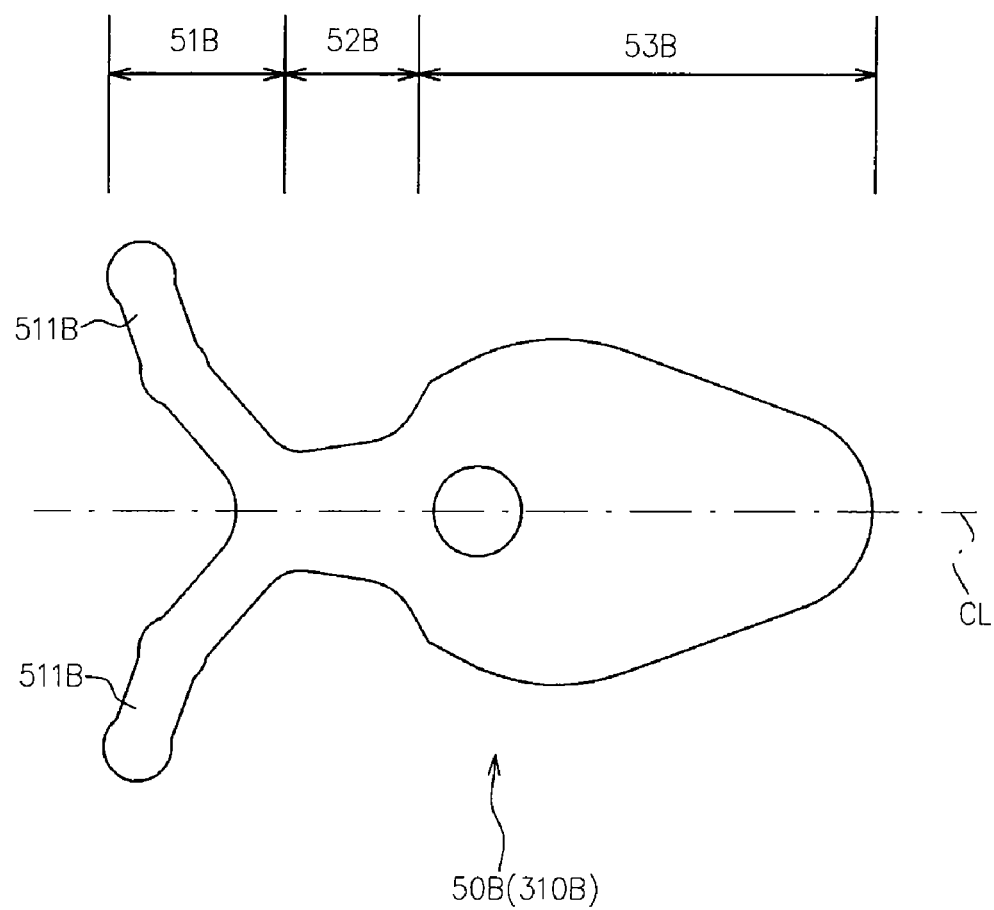
FIG. 7 is a plan view of an equilibrating weight part in the magnetic head suspension according to the second embodiment.

FIG. 7 is a plan view of the equilibrating weight part 50B.

As shown in FIG. 7, the equilibrating weight part 50B includes, in the suspension lengthwise direction, a central portion 52B that is joined to the second elastic plate part 70, a distal end portion 51B that is extended from the central portion 52B toward the distal end side and that is joined to the load beam part component 300A, and a proximal end portion 53B that is extended from the central portion 52B toward the proximal end side.

The central portion 52B and the proximal end portion 53B respectively have shapes identical with those of the equilibrating weight part 50A in the first embodiment.

On the contrary, as shown in FIGS. 6A, 6B, and 7, the distal end portion 51B has a region that is positioned outside the outmost end of the central portion 52B in the suspension widthwise direction as well as is overlapped with the load beam part 30 with respect to suspension lengthwise direction. The distal end portion 51B is joined by welding to the load beam part component 300A.

As described above, the distal end portion 51B of the equilibrating weight part 50B that is overlapped with the load beam part 30 with respect to the suspension lengthwise direction is positioned outside the central portion 52B in the suspension widthwise direction. This configuration can realize an increase in rigidity of the assembly in a twist mode, and an effective rise in resonant frequency in the twist mode.

As shown in FIG. 7, in the present embodiment, the distal end portion 51B includes a pair of beams 511B that are extended to right and left respectively from the center in the suspension widthwise direction.

This configuration can realize an effective rise in resonant frequency of the assembly in the twist mode while inhibiting increase in weight of the portion of the assembly that is positioned on the distal end side than the load bending part 20.

Third Embodiment

Described below with reference to the accompanying drawings is a magnetic head suspension according to a third embodiment of the present invention.

Figure 8:
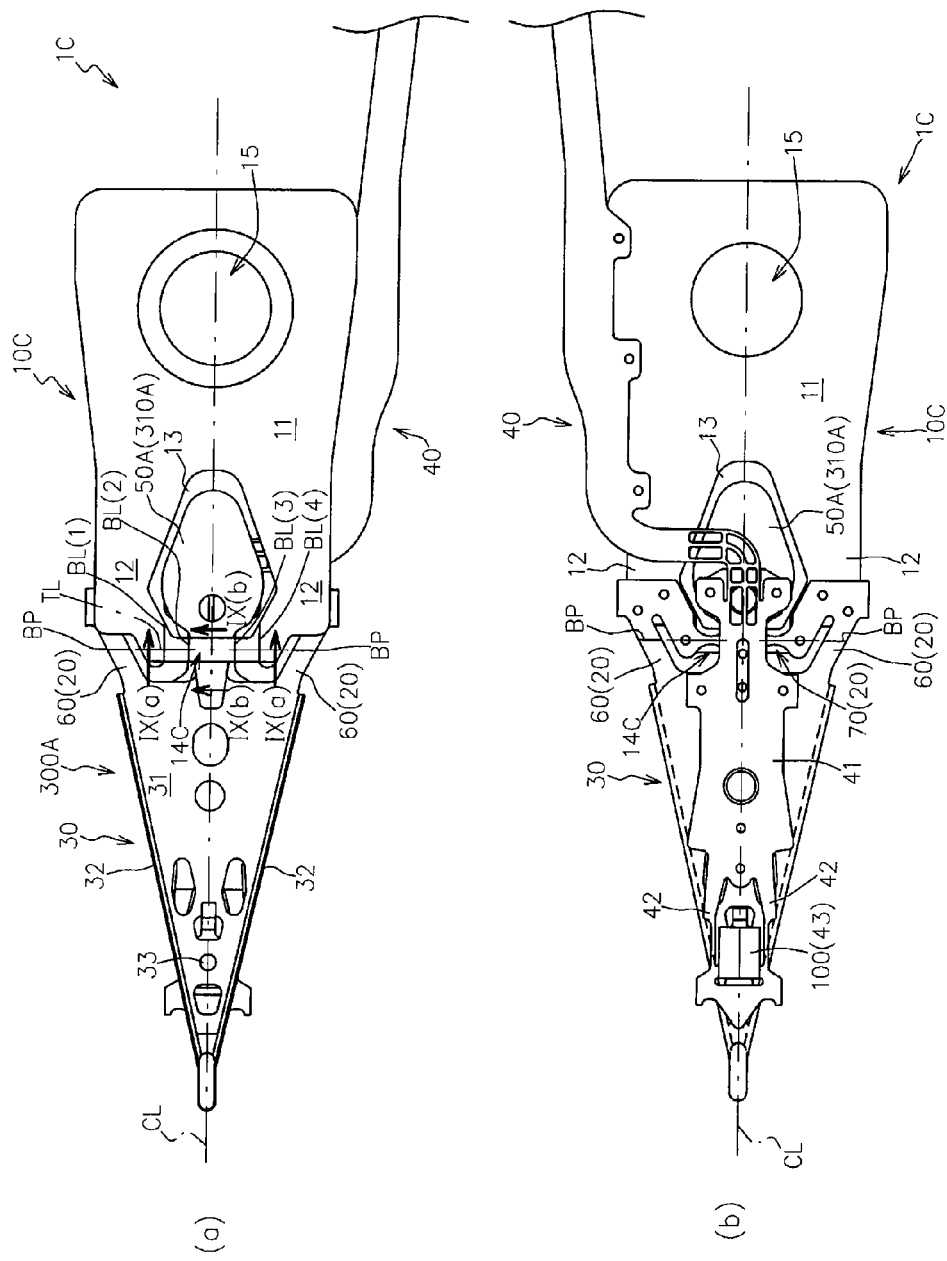
FIGS. 8A and 8B are a top view and a bottom view respectively, of a magnetic head suspension according to a third embodiment of the present invention.

FIGS. 8A and 8B are a top view (a plan view as viewed from the side opposite from the disk surface) and a bottom view (a bottom view as viewed from the side close to the disk surface) respectively, of a magnetic head suspension 1C according to the present embodiment. It is noted that small circles in FIG. 8B each indicate a welding point.

Figure 9:
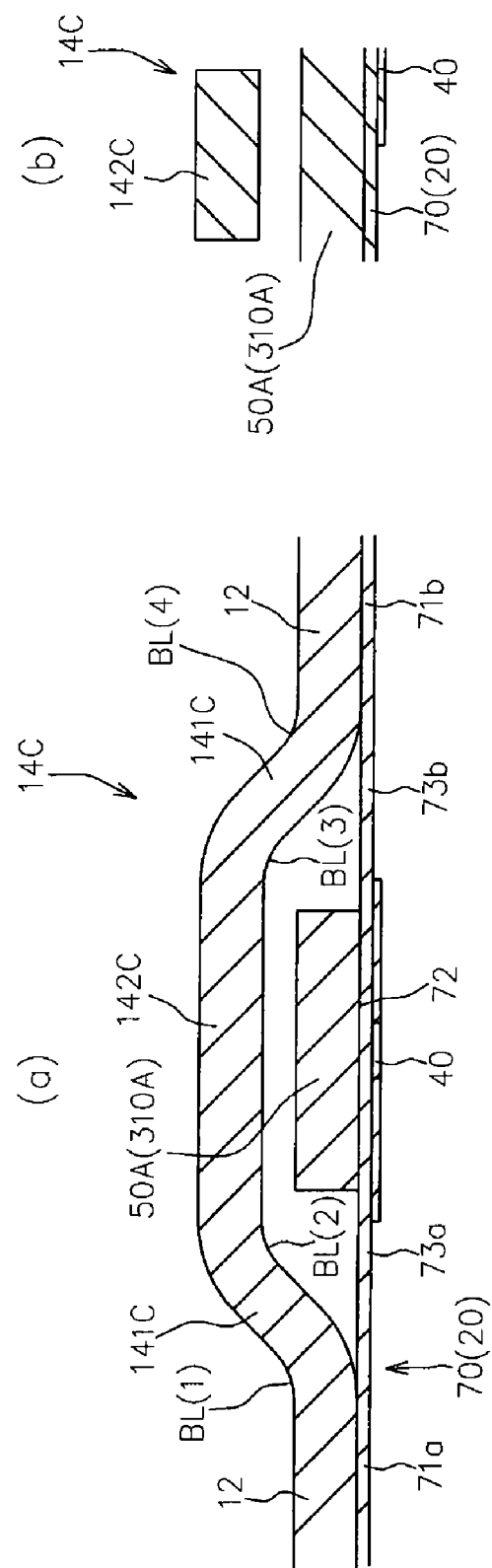
FIGS. 9A and 9B are cross sectional views respectively cut along Line IX(a)-IX(a) and Line IX(b)-IX(b) in FIG. 8A.

Further, FIGS. 9A and 9B are cross sectional views respectively cut along Line IX(a)-IX(a) and Line IX(b)-IX(b) that are indicated in FIG. 8A.

In the drawings, the components identical to those according to any of the first and second embodiments are denoted by the identical symbols, and detailed description thereof will not be repeated in the present embodiment.

The magnetic head suspension IC according to the present embodiment is different from the magnetic head suspension 1A according to the first embodiment in that there is provided a connecting piece 14C which connects the pair of support pieces 12 with each other.

As shown in FIGS. 8A, 8B, 9A, and 9B, the connecting piece 14C is positioned above the surface of the assembly that is opposite from the disk surface, and connects the pair of support pieces 12 with each other while being spaced apart from the assembly by a predetermined distance in the direction orthogonal to the disk surface.

More specifically, as shown in FIG. 9A, the connecting piece 14C has a pair of arm regions 141C that have proximal ends connected respectively to the pair of support pieces 12 and distal ends located farther away from the disk surface relative to the proximal ends, and a bridge region 142C that connects between the distal ends of the pair of arm regions 141C at a position away from the rear surface of the assembly in a direction opposite from the disk surface by a predetermined distance.

Provision of the connecting piece 14C realizes increase in rigidity of a supporting part 10C provided with the pair of support pieces 12 in a sway direction as well as in a twist direction. Further, the connecting piece 14C can effectively suppress the amount of jumping action of the magnetic head slider 100 when an extraneous impact force is applied, while allowing the second elastic plate part 70 to be elastically twisted around the twist axis line TL when the magnetic head suspension 1C is in the operating condition.

The bridge region 142C is preferably disposed to be overlapped in planar view with the twist axis line TL of the second elastic plate part 70.

This configuration can effectively prevent displacement of the connecting points between the assembly and the load bending part 20 in the direction orthogonal to the disk surface upon application of an impact force. Accordingly, it is possible to further effectively suppress the amount of jumping action of the magnetic head slider 100.

In the present embodiment, as shown in FIGS. 8A and 9A, the connecting piece 14C is fabricated by being bent on four bending reference lines BL(1) to BL(4) that follow the suspension lengthwise direction, so that the bridge region 142C is located above the surface of the assembly that is opposite from the disk surface.

More specifically, the pair of arm regions 141C are each fabricated such that the proximal end and the distal end are bent on the bending reference lines BL(1) to BL(4) along the suspension lengthwise direction. Accordingly, the bridge region 142C is located above the surface of the assembly not facing the disk surface.

As shown in FIGS. 8A, 8B, 9A, and 9B, in the present embodiment, the connecting piece 14C is formed integrally with the supporting part 10C so as to prevent increase in number of the components.

More specifically, the magnetic head suspension 1C according to the present embodiment includes the supporting part 10C in place of the supporting part 10A that is included in the magnetic head suspension 1A according to the first embodiment, the supporting part 10C integrally including the connecting piece 14C in addition to the main body region 11 and the pair of support pieces 12.

It is of course possible to alternatively form the connecting piece 14C separately from the supporting part 10C and weld the connecting piece 14C to the supporting part 10C.

Further, it is of course possible to appropriately apply one or a plurality of components in each of the embodiments already described and to be described later to a magnetic head suspension according to a different embodiment in place of the corresponding component(s).

For example, the magnetic head suspension 1C according to the present embodiment may be provided with the equilibrating weight part 50B in place of the equilibrating weight part 50A.

Fourth Embodiment

Described below with reference to the accompanying drawings is a magnetic head suspension according to a fourth embodiment of the present invention.

Figure 10:
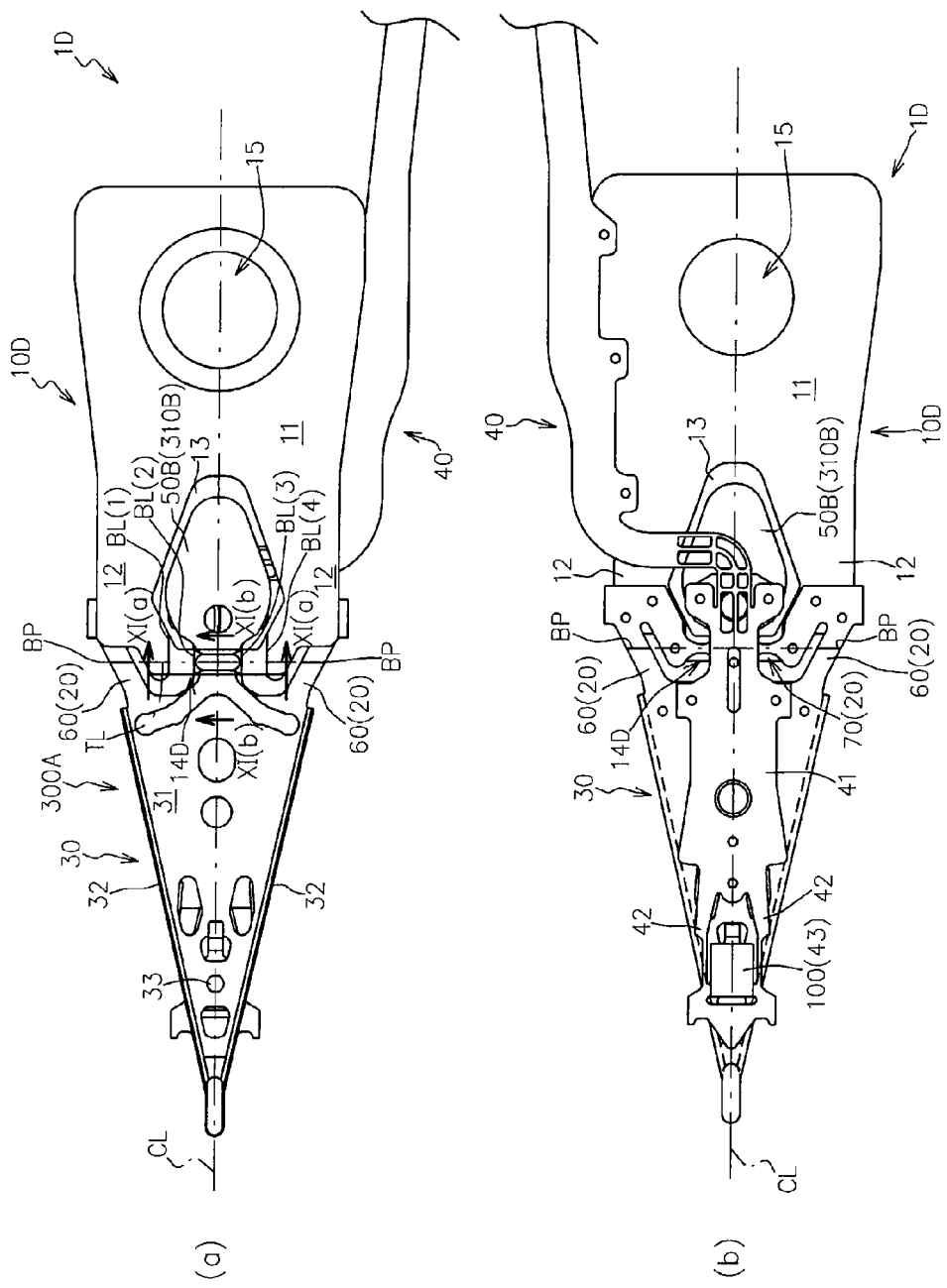
FIGS. 10A and 10B are a top view and a bottom view respectively, of a magnetic head suspension according to a fourth embodiment of the present invention.

FIGS. 10A and 10B are a top view (a plan view as viewed from the side opposite from the disk surface) and a bottom view (a bottom view as viewed from the side close to the disk surface) respectively, of a magnetic head suspension 1D according to the present embodiment. It is noted that small circles in FIG. 10B each indicate a welding point.

Figure 11:
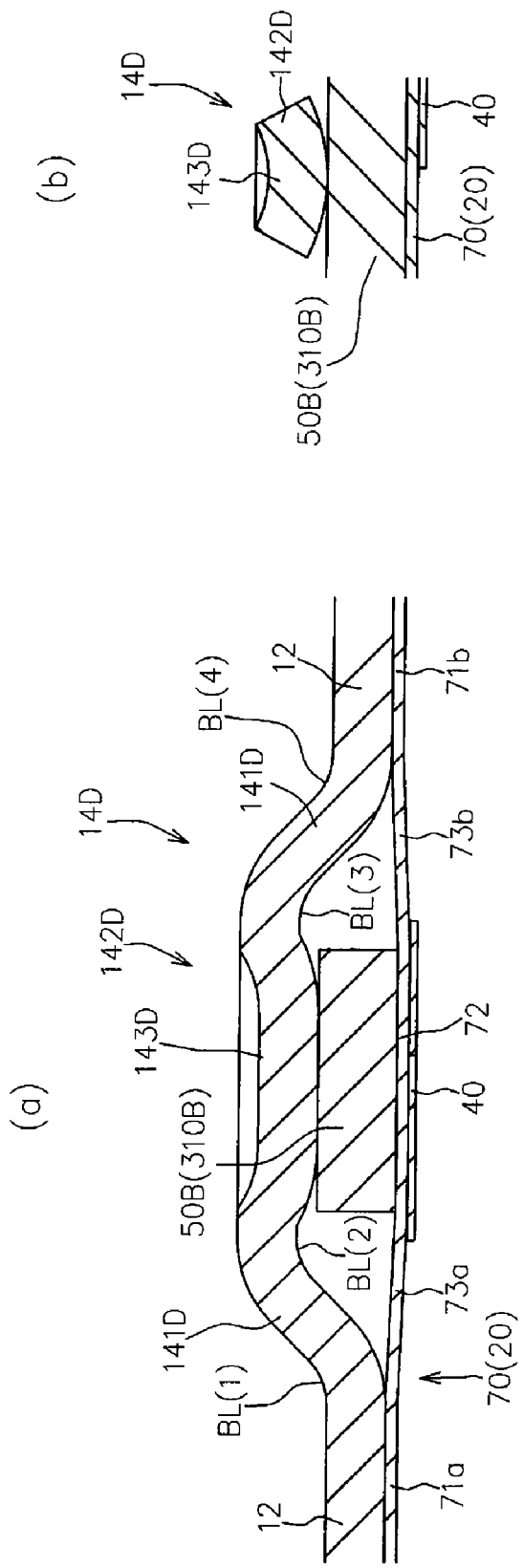
FIGS. 11A and 11B are cross sectional views respectively cut along Line XI(a)-XI(a) and Line XI(b)-XI(b) in FIG. 10A.

Further, FIGS. 11A and 11B are cross sectional views respectively cut along Line XI(a)-XI(a) and Line XI(b)-XI(b) that are indicated in FIG. 10A.

In the drawings, the components identical to those according to any of the first to third embodiments are denoted by the identical symbols, and detailed description thereof will not be repeated in the present embodiment.

As shown in FIGS. 10A, 10B, 11A, and 11B, the magnetic head suspension 1D according to the present embodiment includes a connecting piece 14D in place of the connecting piece 14C.

Similarly to the connecting piece 14C, the connecting piece 14D has a pair of arm regions 141D that have proximal ends connected respectively to the pair of support pieces 12 and distal ends located farther away from the disk surface relative to the proximal ends, and a bridge region 142D that connects the distal ends of the pair of arm regions 141D with each other.

The bridge region 142D of the connecting piece 14D is brought into contact with the rear surface of the assembly that is opposite from the disk surface through a contact structure. This contact structure is located at a substantially identical position with the twist axis line TL in the suspension lengthwise direction and is formed symmetrically with the longitudinal center line CL of the magnetic head suspension as a reference.

The contact structure allows the assembly to turn about the twist axis line TL in a state where the assembly is in contact with the connecting piece 14D.

Therefore, it is possible to further increase rigidity of the assembly in the sway direction as well as in the twist direction at a time when the magnetic head suspension 1D is in the operating condition, while realizing the effects in the third embodiment. Moreover, it is possible to further effectively prevent jumping action of the magnetic head slider 100 when an impact force is applied.

As shown in FIGS. 11A and 11B, in the present embodiment, the bridge region 142D is provided with a projection 143D that projects toward the assembly so as to be in contact with the rear surface of the assembly, the projection 143D forming the contact structure.

The projection 143D has a curved shape in vertically sectional side view as shown in FIG. 11B and is formed symmetrically with the longitudinal center line CL as a reference as shown in FIG. 10A. More specifically, the projection 143D is configured so that its apex area that is in contact with the rear surface of the assembly is along the twist axis line TL in a state of being disposed on the same position as the twist axis line TL in the suspension lengthwise direction and being symmetric with the longitudinal center line CL of the magnetic head suspension as a reference.

The contact structure may be embodied by a projection that brings the bridge region 142D into contact with the assembly in a point contact manner, in place of the projection 143D that brings the bridge region 142D into contact with the assembly in a linear contact manner.

For example, it is possible to provide a single projection positioned on the longitudinal center line CL of the magnetic head suspension as well as on the twist axis line TL. Alternatively, it is possible to provide a plurality of projections that are symmetrical one another with the longitudinal center line CL of the magnetic head suspension as a reference in a state of being disposed on the twist axis line TL.

The contact structure is provided to the connecting piece 14D in the present embodiment. Alternatively, it is possible to provide the contact structure to the assembly (such as the equilibrating weight part).

More specifically, the assembly may be provided on the rear surface thereof with a projection that is in contact with the bridge region 142D in a linear contact manner, or a single or a plurality of projection(s) that each is contact with the bride region 142D in a point contact manner.

In each of the embodiments already described and to be described later, each of the supporting parts 10A, 10C, and 10D is embodied by a base plate. The supporting part may be of course embodied alternatively by an arm.

Figure 12:
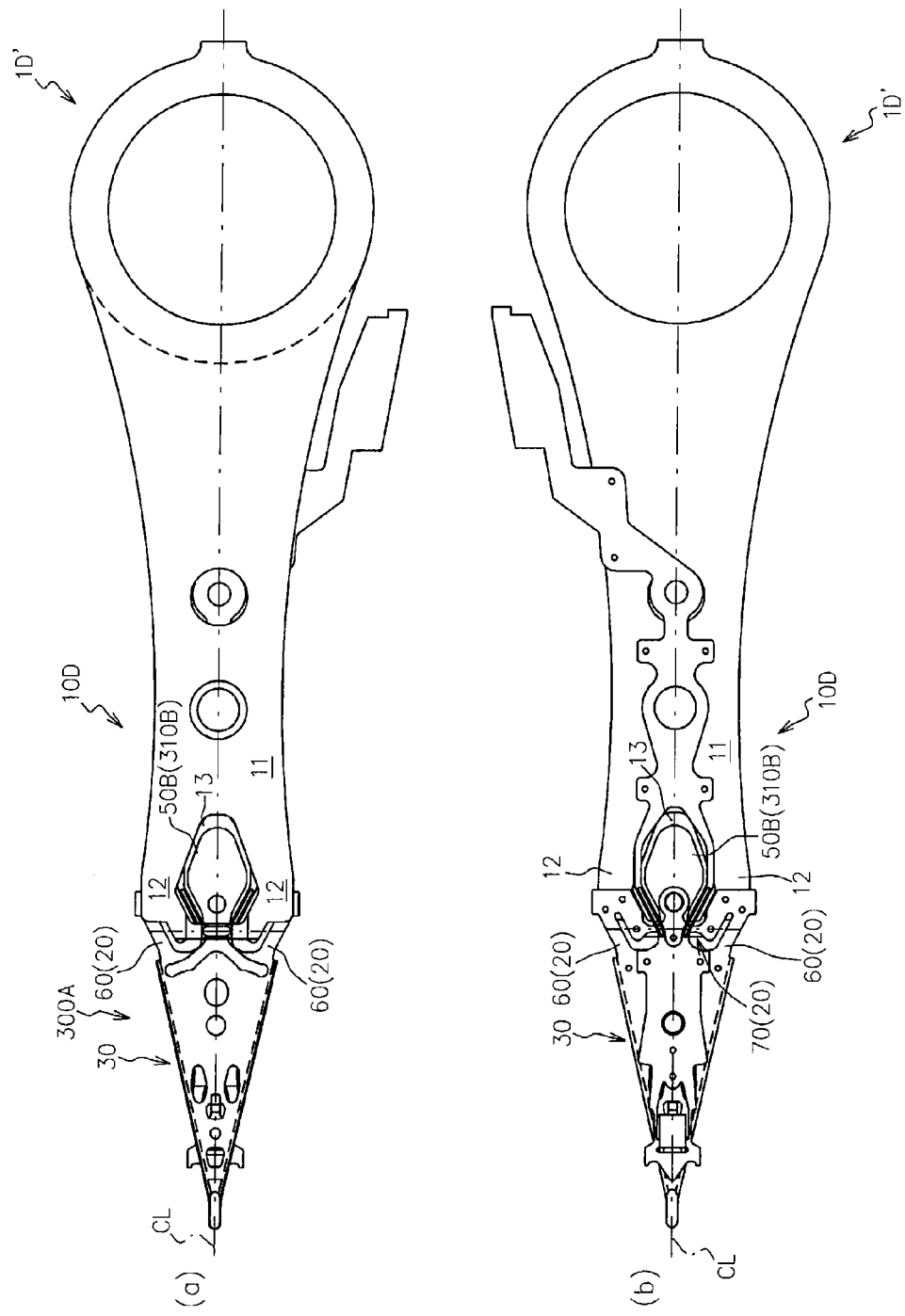
FIGS. 12A and 12B are a top view and a bottom view respectively, of a modified example of the magnetic head suspension according to the fourth embodiment that is provided with an arm as a supporting part.

FIGS. 12A and 12B are a top view and a bottom view of a modified magnetic head suspension 1D' that is provided with an arm in place of the base plate functioning as the supporting part 10D in the magnetic head suspension 1D according to the fourth embodiment. It is noted that small circles in FIG. 12B each indicate a welding point.

Fifth Embodiment

Described below with reference to the accompanying drawings is a magnetic head suspension according to a fifth embodiment of the present invention.

Figure 13:
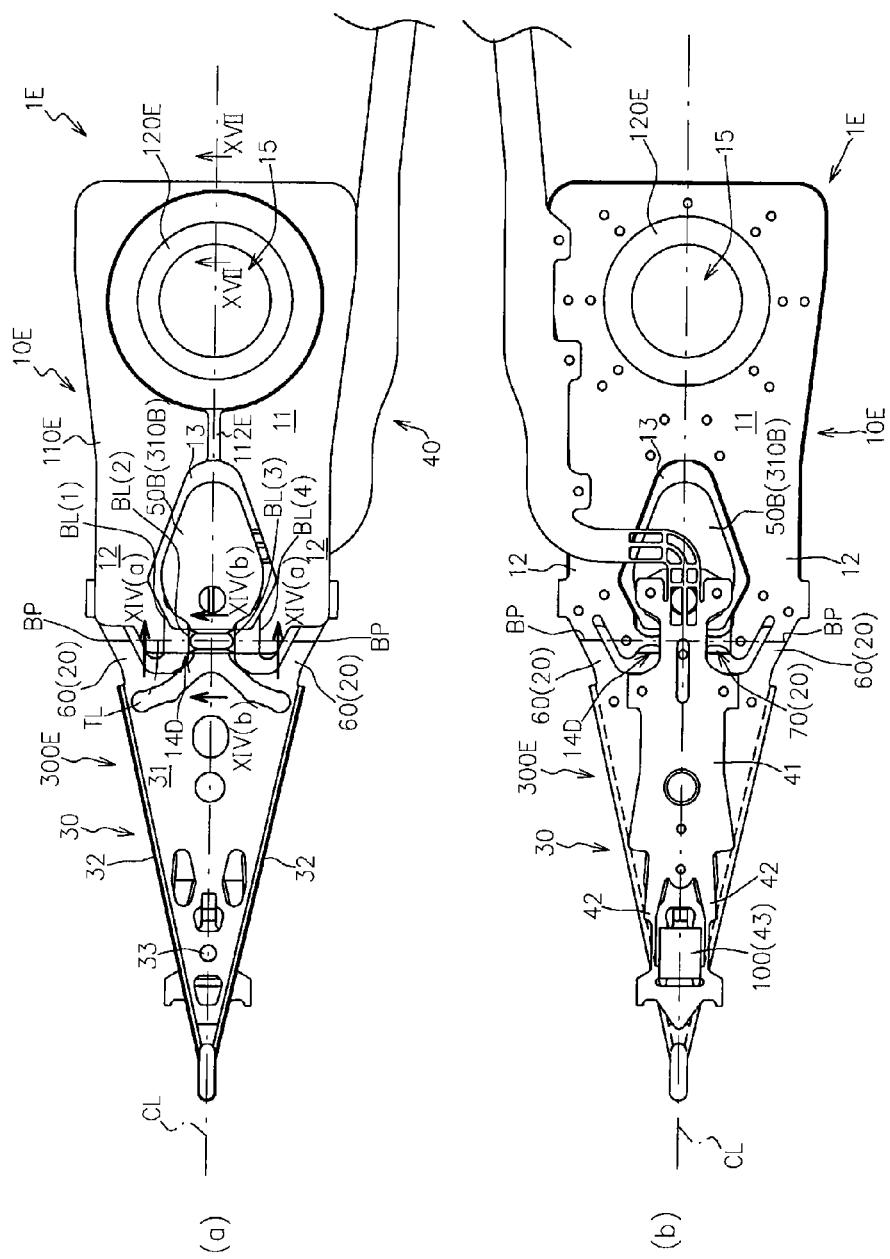
FIGS. 13A and 13B are a top view and a bottom view respectively, of a magnetic head suspension according to a fifth embodiment of the present invention.

FIGS. 13A and 13B are a top view (a plan view as viewed from the side opposite from the disk surface) and a bottom view (a bottom view as viewed from the side close to the disk surface) respectively, of a magnetic head suspension 1E according to the present embodiment. It is noted that small circles in FIG. 13B each indicate a welding point.

Figure 14:
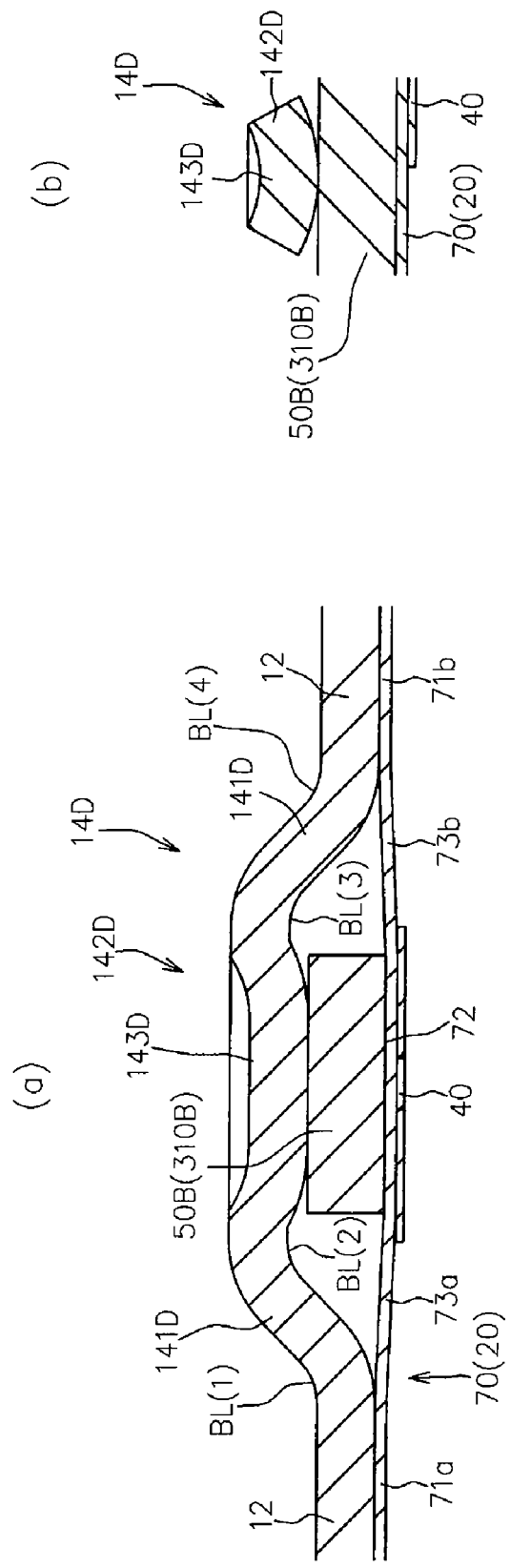
FIGS. 14A and 14B are cross sectional views respectively cut along Line XIV(a)-XIV(a) and Line XIV(b)-XIV(b) in FIG. 13A.

Further, FIGS. 14A and 14B are cross sectional views respectively cut along Line XIV(a)-XIV(a) and Line XIV(b)-XIV(b) that are indicated in FIG. 13A.

In the drawings, the components identical to those according to any of the first to fourth embodiments are denoted by the identical symbols, and detailed description thereof will not be repeated in the present embodiment.

The magnetic head suspension 1E according to the present embodiment is configured such that the connecting piece 14D is provided integrally with a supporting part 10E including the pair of support pieces 12, and is capable of preventing or reducing the pair of support pieces 12 from being deformed at the time when the connecting piece 14D is fabricated.

More specifically, as shown in FIGS. 13A and 13B, the magnetic head suspension 1E includes the supporting part 10E that integrally has the main body region 11, the pair of support pieces 12, and the connecting piece 14D.

In the present embodiment, the supporting part 10E is configured by a base plate that includes the boss part 15 provided with a boss hole to be joined by swaging to a distal end of an arm of an E block.

The supporting part 10E includes a first plate member 110E that integrally has a region corresponding to the main body region 11, the pair of support pieces 12, and the connecting piece 14D, and a boss member 120E that is joined by welding to the first plate member 110E and that forms the boss part 15.

Figure 15:
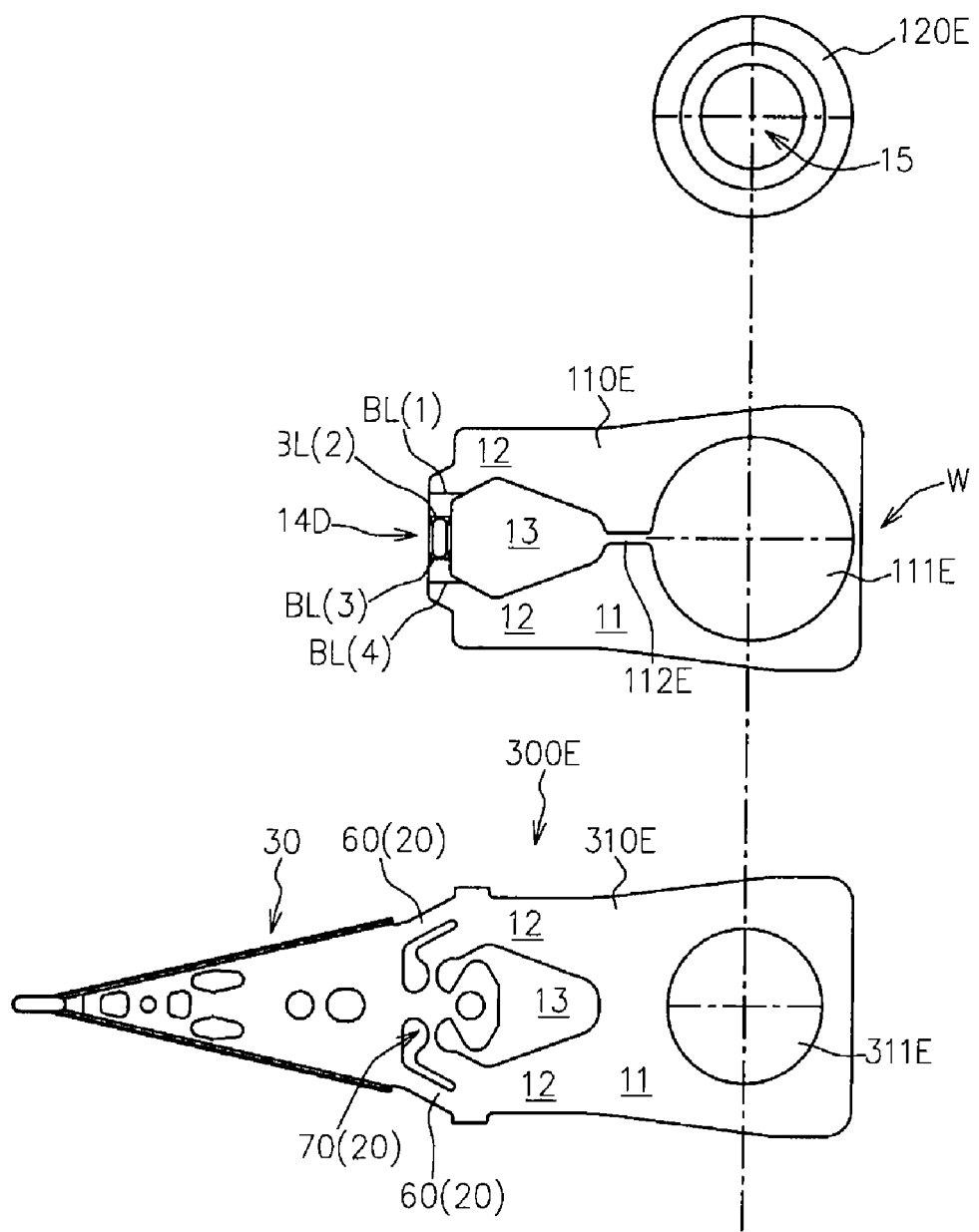
FIG. 15 is a partial exploded plan view of the magnetic head suspension according to the fifth embodiment.

FIG. 15 is an exploded plan view of the first plate member 110E and the boss member 120E.

As shown in FIG. 15, the first plate member 110E has the region corresponding to the main body region 11, the pair of support pieces 12, and the connecting piece 14D. The main body region 11 is provided with a first mounting hole 111E in which boss member 120E is mounted, and a slit 112E that communicates the concave part 13 defined by the pair of support pieces 12 with the first mounting hole 111E.

The boss member 120E is fitted in the first mounting hole 111E and is joined by welding to the first plate member 110E.

The magnetic head suspension 1E thus configured makes it possible to prevent or reduce the pair of support pieces 12 from being deformed at the time when connecting piece 14D is fabricated, while obtaining the effects thanks to the connecting piece 14D.

More specifically, in the magnetic head suspension 1E according to the present embodiment, similarly to the magnetic head suspensions 1C and 1D according to the third and fourth embodiments, the connecting piece 14D is fabricated by being bent on the bending reference lines BL(1) to BL(4) along the suspension lengthwise direction so as to be provided integrally with the supporting part 10E.

In other words, the connecting piece 14D is fabricated by being bent on the bending reference lines BL(1) to BL(4) along the suspension lengthwise direction, between the pair of support pieces 12 and the pair of arm regions 141D and between the pair of arm regions 141D and the bridge region 142D, respectively, such that the bridge region 142D is located farther away from the disk surface relative to the pair of support pieces 12.

As described above, the connecting piece 14D formed integrally with the supporting part 10E is fabricated by being bent on the bending reference lines BL(1) to BL(4) along the suspension lengthwise direction, so that the bridge region 142D is located farther away from the disk surface relative to the pair of support pieces 12. In this case, each of the pair of support pieces 12 is applied with a stress directed to the other support piece 12 upon bending fabrication, and each of the pair of support pieces 12 is deformed by such a stress.

Thus, in each of the magnetic head suspensions 1C and 1D according to the third and fourth embodiments, there is required a process of correcting the pair of support pieces 12 that has been deformed due to fabrication of the connecting piece 14C or 14D (such as a process of correcting the deformed pair of support pieces 12 by applying a pressing force to the pair of support pieces 12).

On the contrary, in the present embodiment, as described above, the first plate member 110E that has the pair of support pieces 12 and the connecting piece 14D is provided with the slit 112E that allows the concave part 13 defined by the pair of support pieces 12 to be communicated with the first mounting hole 111E.

In this configuration, upon fabrication described above in which the bridge region 142D is bent so as to be located farther away from the disk surface relative to the pair of support pieces 12, the stress is concentrated on and around a less rigid portion in the first plate member 110E (on and around a W portion in FIG. 15 in the present embodiment). Thus, it is possible to effectively prevent or reduce deformation of the pair of support pieces 12 due to the stress.

Figure 16:
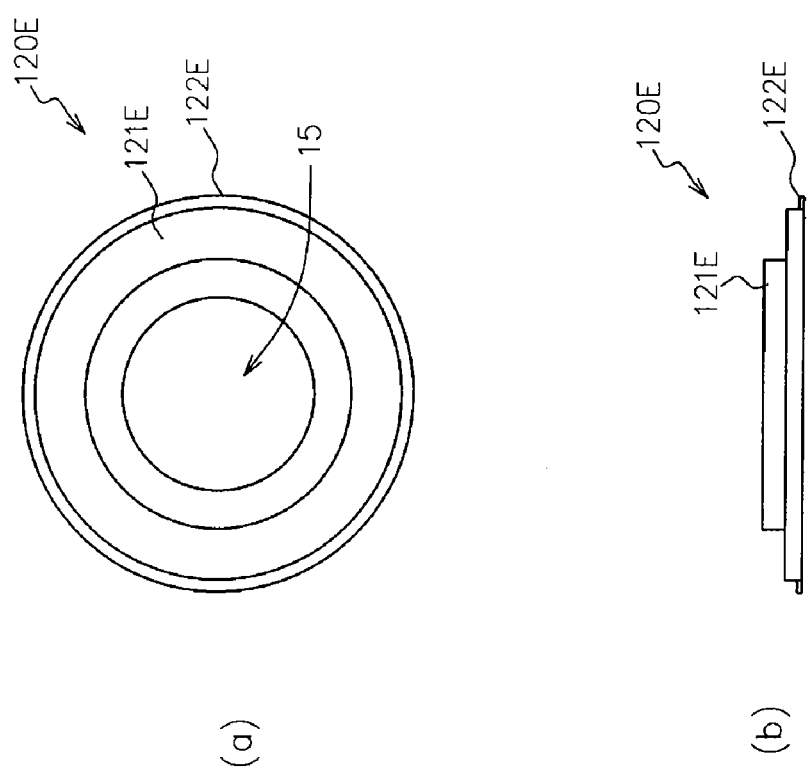
FIGS. 16A and 16B are a plan view and a side view of a boss member respectively, in the magnetic head suspension according to the fifth embodiment.

FIGS. 16A and 16B are a plan view and a side view of the boss member 120E, respectively.

Figure 17:
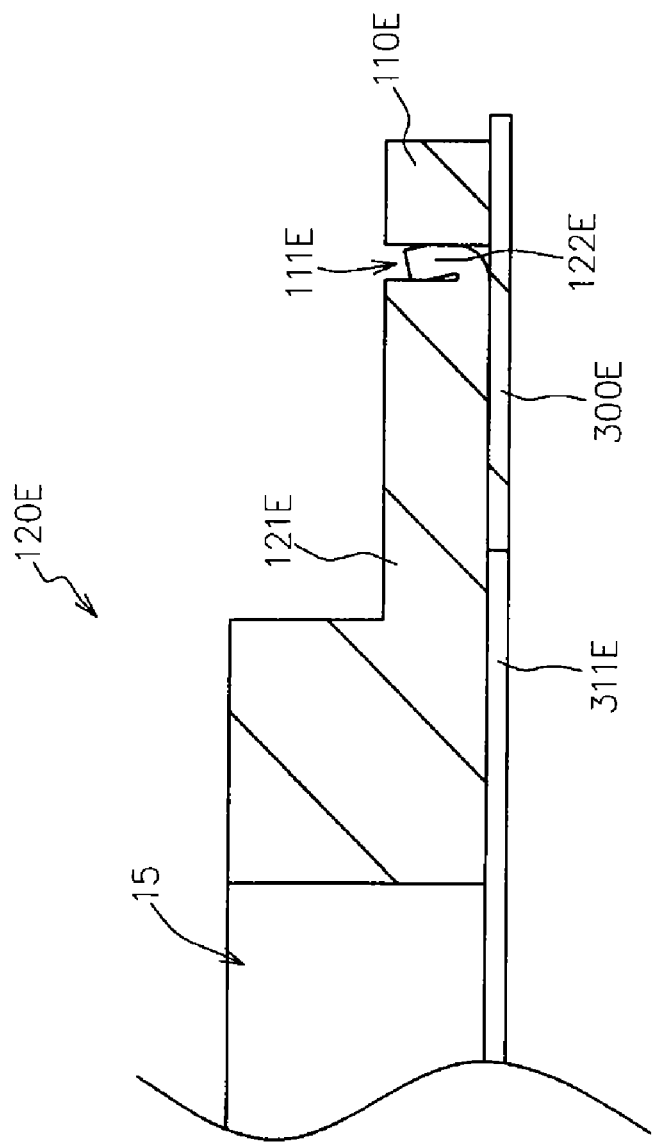
FIG. 17 is a cross sectional view cut along Line XVII-XVII in FIG. 13A.

Further, FIG. 17 is a cross sectional view cut along Line XVII-XVII that is indicated in FIG. 13A.

As shown in FIGS. 16A and 16B, the boss member 120E may preferably include a main body part 121E that is provided with the boss hole and has an outer diameter slightly smaller than the diameter of the first mounting hole 111E, and a caulk piece 122E that is extended radially outwards from the main body part 121E and has an outer diameter slightly larger than the diameter of the first mounting hole 111E.

As shown in FIG. 17, the boss member 120E is fitted in the first mounting hole 111E with the caulk piece 122E being caulked therein.

This configuration realizes easy and solid joining between the boss member 120E and the first plate member 110E.

The magnetic head suspension 1E according to the present embodiment is further configured as follows, so as to secure rigidity of the supporting part 10E while the thickness of the first plate member 110E being reduced, thereby to facilitate fabrication of the connecting piece 14D.

More specifically, the magnetic head suspension 1E includes a load beam part component 300E in place of the load beam part component 300A.

FIG. 15 also shows the load beam part component 300E.

As shown in FIGS. 13B and 15, the load beam part component 300E integrally includes a supporting part configuring region 310E corresponding to the region of the supporting part 10E exclusive of the connecting piece 14D, in addition to the region corresponding to the load beam part 30, the region corresponding to the pair of first elastic plate parts 60, and the region corresponding to the second elastic plate part 70.

The supporting part configuring region 310E is provided with a second mounting hole 311E that is disposed concentrically with the boss hole. The second mounting hole 311E has a diameter larger than that of the boss hole.

The first plate member 110E is joined by welding to the rear surface of the load beam part component 300E that is opposite from the disk surface, with the first mounting hole 111E being positioned concentrically with the second mounting hole 311E.

In other words, in the present embodiment, the supporting part 10E is configured by the first plate member 110E, the supporting part configuring region 310E in the load beam part component 300E, and the boss member 120E.

This configuration makes it possible to secure rigidity of the supporting part 10E by provision of the supporting part configuring region 310E in the load beam part component 300E, while facilitating fabrication of the connecting piece 14D thanks to reduction in thickness of the first plate member 110E.

As shown in FIG. 17, in the present embodiment, the second mounting hole 311E has an inner diameter smaller than the outer diameter of the main body part 121E in the boss member 120E, so as to facilitate workability in joining the boss member 120E to the first plate member 110E.

In this configuration, at the time when the boss member 120E is fitted in the first mounting hole 111E, it is possible to bring a part of the facing surface, which faces the disk surface, of the main body part 121E in the boss member 120E into contact with the rear surface, which is opposite from the disk surface, of the supporting part configuring region 310E in the load beam part component 300E, so that the boss member 120E can be positioned.

Therefore, facilitated is joining between the boss member 120E and the first plate member 110E.

Sixth Embodiment

Described below with reference to the accompanying drawings is a magnetic head suspension according to a sixth embodiment of the present invention.

Figure 18:
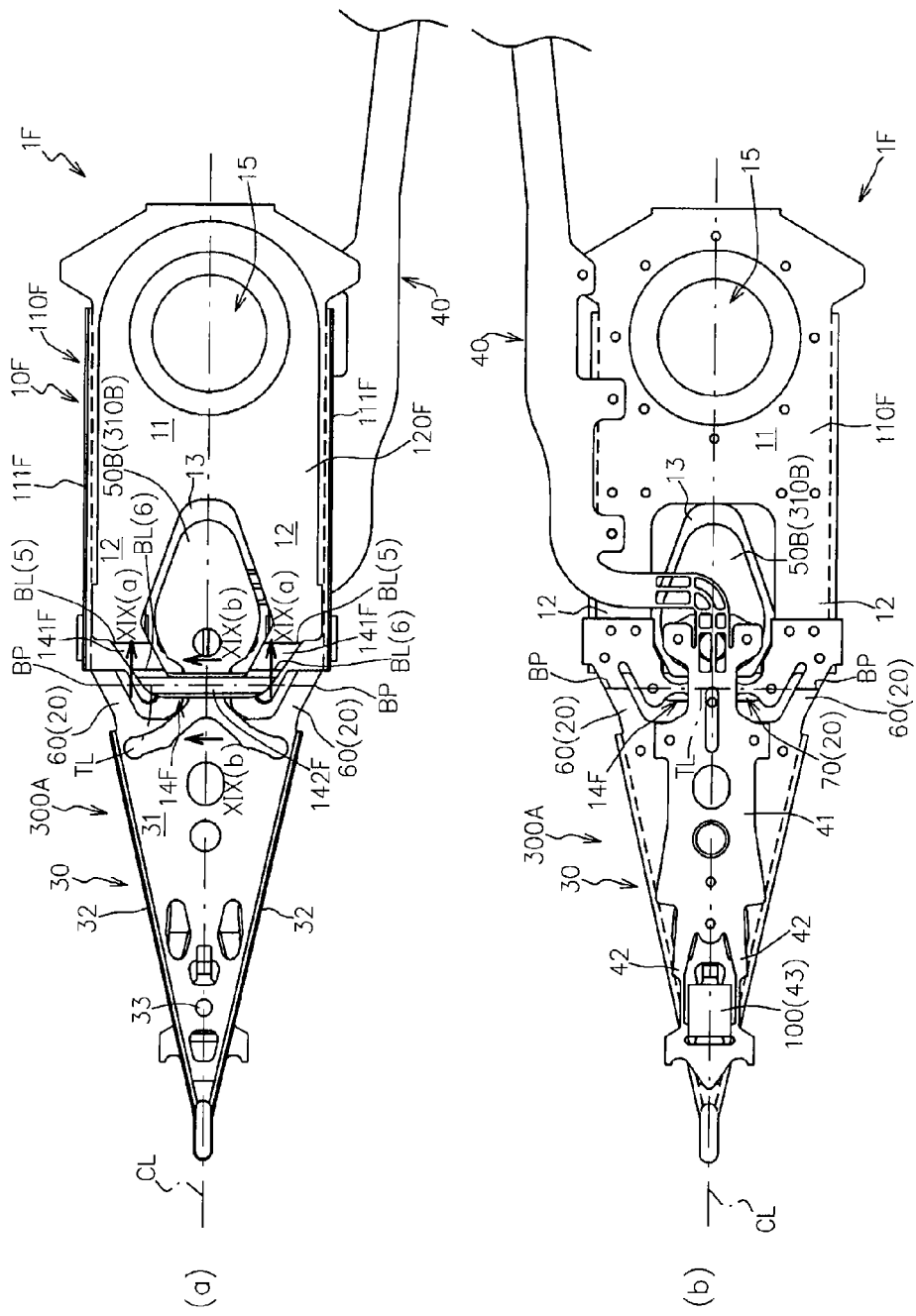
FIGS. 18A and 18B are a top view and a bottom view respectively, of a magnetic head suspension according to a sixth embodiment of the present invention.

FIGS. 18A and 18B are a top view (a plan view as viewed from the side opposite from the disk surface) and a bottom view (a bottom view as viewed from the side close to the disk surface) respectively, of a magnetic head suspension 1F according to the present embodiment. It is noted that small circles in FIG. 18B each indicate a welding point.

Figure 19:
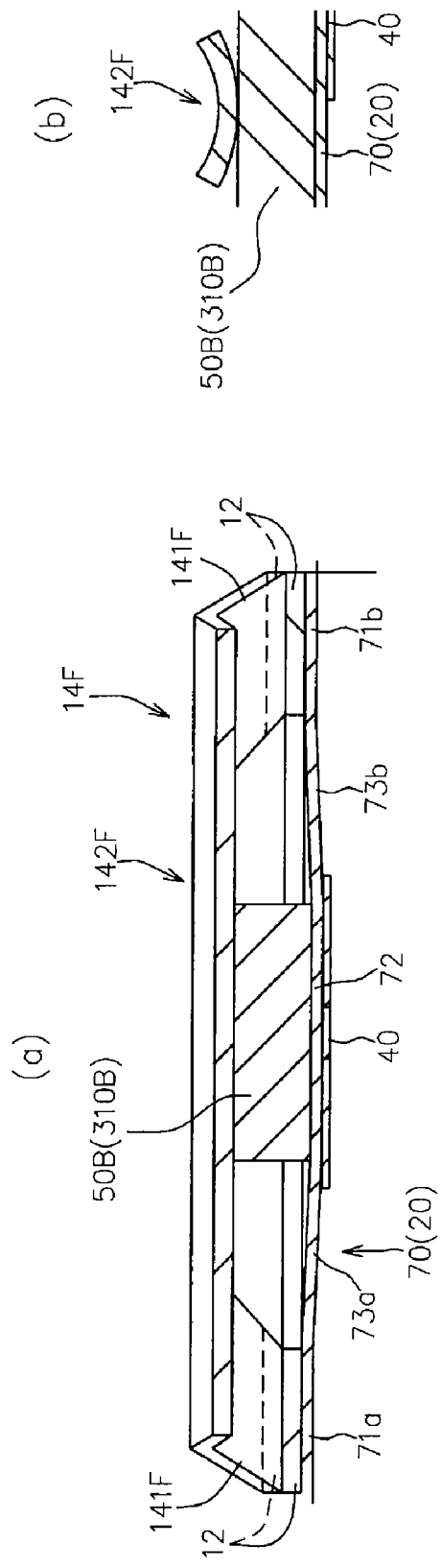
FIGS. 19A and 19B are cross sectional views respectively cut along Line XIX(a)-XIX(a) and Line XIX(b)-XIX(b) in FIG. 18A.

Further, FIGS. 19A and 19B are cross sectional views respectively cut along Line XIX(a)-XIX(a) and Line XIX(b)-XIX(b) that are indicated in FIG. 18A.

In the drawings, the components identical to those according to any of the first to fifth embodiments are denoted by the identical symbols, and detailed description thereof will not be repeated in the present embodiment.

The magnetic head suspension 1F according to the present embodiment includes a supporting part 10F that is provided with the pair of support pieces 12.

As in each of the third to fifth embodiments described above, the supporting part 10F integrally has a connecting piece 14F that connects the pair of support pieces 12 with each other on the side of the assembly that is opposite from the disk surface.

As shown in FIGS. 18A and 19A, the connecting piece 14F includes a pair of arm regions 141F that have proximal ends connected respectively to the pair of support pieces 12 and distal ends located farther away from the disk surface relative to the proximal ends, and a bridge region 142F that connects the distal ends of the pair of arm regions 141F with each other.

The connecting piece 14F is in common with the connecting pieces 14C and 14D according to the foregoing third to fifth embodiments in that the bridge region 142F is located on the side of the assembly that is opposite form the disk surface and is overlapped with the twist axis line TL in planar view. However, the connecting piece 14F is different from the connecting pieces 14C and 14D in the following points.

In each of the connecting pieces 14C and 14D according to the third to fifth embodiments, the proximal ends and the distal ends of the pair of arm regions 141C or 141D are fabricated by being bent on the bending reference lines BL(1) to BL(4) along the suspension lengthwise direction, so that the bridge region 142C or 142D is positioned on the side of the assembly that is opposite from the disk surface.

On the contrary, as shown in FIGS. 18A, 18B, 19A, and 19B, the connecting piece 14F in the present embodiment is bent at the proximal ends and the distal ends of the pair of arm regions 141F around bending reference lines BL(5) and BL(6) along the suspension widthwise direction, so that the bridge region 142F is positioned on the side of the assembly that is opposite from the disk surface.

In the magnetic head suspension 1F thus configured, each of the pair of support pieces 12 is not applied with a stress directed to the other support piece 12 at the time when the connecting piece 14F is fabricated by being bent. Accordingly, it is possible to effectively prevent deformation of the pair of support pieces 12 due to fabrication of the connecting piece 14F.

In the present embodiment, the supporting part 10F is configured by a first supporting part component plate 110F and a second supporting part component plate 120F that are layered and joined by welding to each other. This configuration can facilitate fabrication of the connecting piece 14F while rigidity of the supporting part 10F being unchanged.

Figure 20:
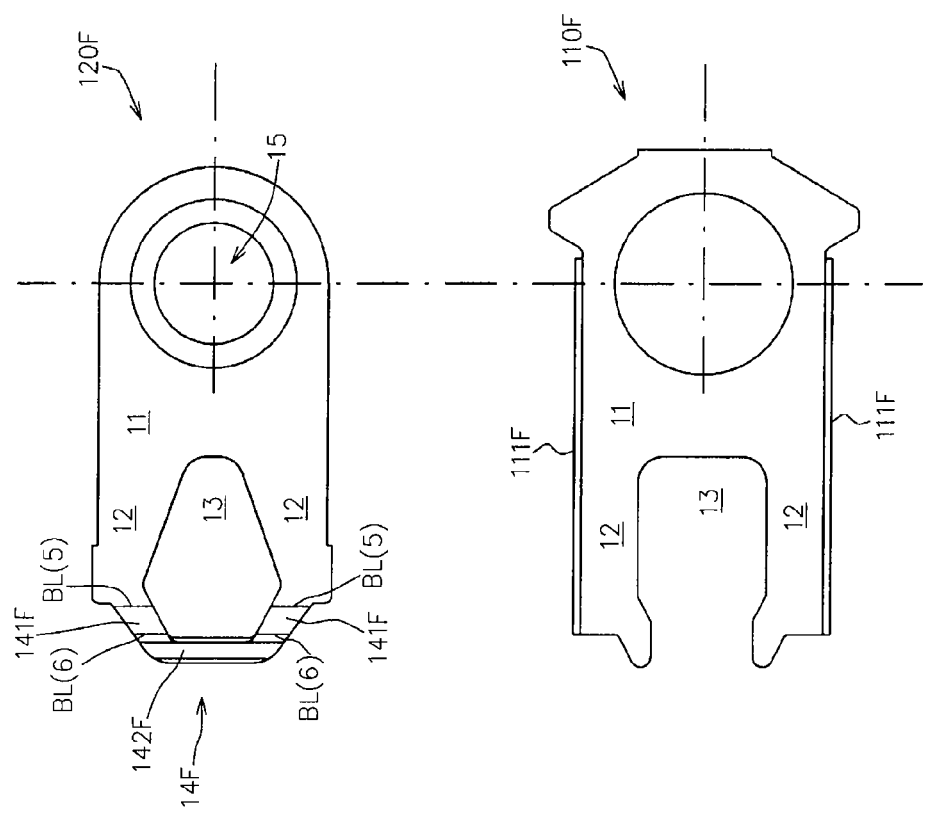
FIG. 20 is an exploded plan view of a supporting part in the magnetic head suspension according to the sixth embodiment.

FIG. 20 is an exploded plan view of the first supporting part component plate 110F and the second supporting part component plate 120F.

As shown in FIG. 20, the first supporting part component plate 110F integrally has a region corresponding to the main body region 11 and a region corresponding to the pair of support pieces 12.

On the other hand, the second supporting part component plate 120F integrally has a region corresponding to the connecting piece 14F, in addition to a region corresponding to the main body region 11 and a region corresponding to the pair of support pieces 12.

This configuration makes it possible to reduce thickness of the second supporting part component plate 120F, which integrally has the connecting piece 14F, to facilitate fabrication of the connecting piece 14F, while securing rigidity of the supporting part 10F by provision of the first supporting part component plate 110F There is no need to apply bending fabrication to the first supporting part component plate 110F. Accordingly, rigidity of the first supporting part component plate 110F can be secured by increase in thickness thereof and/or by provision of flanges 111F on both side edges thereof (see FIG. 20).

Seventh Embodiment

Described below with reference to the accompanying drawings is a magnetic head suspension according to a seventh embodiment of the present invention.

Figure 21:
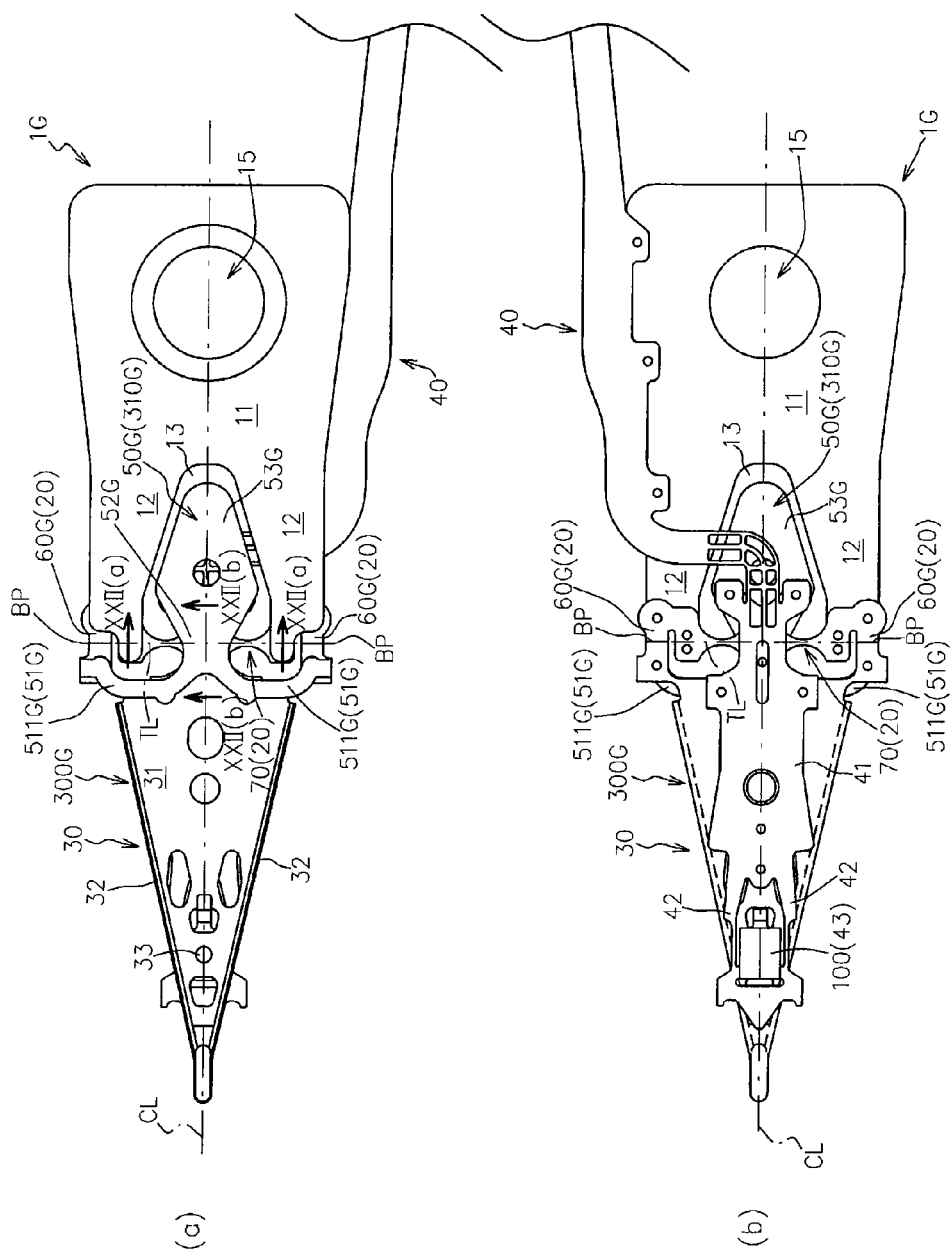
FIGS. 21A and 21B are a top view and a bottom view respectively, of a magnetic head suspension according to a seventh embodiment of the present invention.

FIGS. 21A and 21B are a top view (a plan view as viewed from the side opposite from the disk surface) and a bottom view (a bottom view as viewed from the side close to the disk surface) respectively, of a magnetic head suspension 1G according to the present embodiment. It is noted that small circles in FIG. 21B each indicate a welding point.

Figure 22:
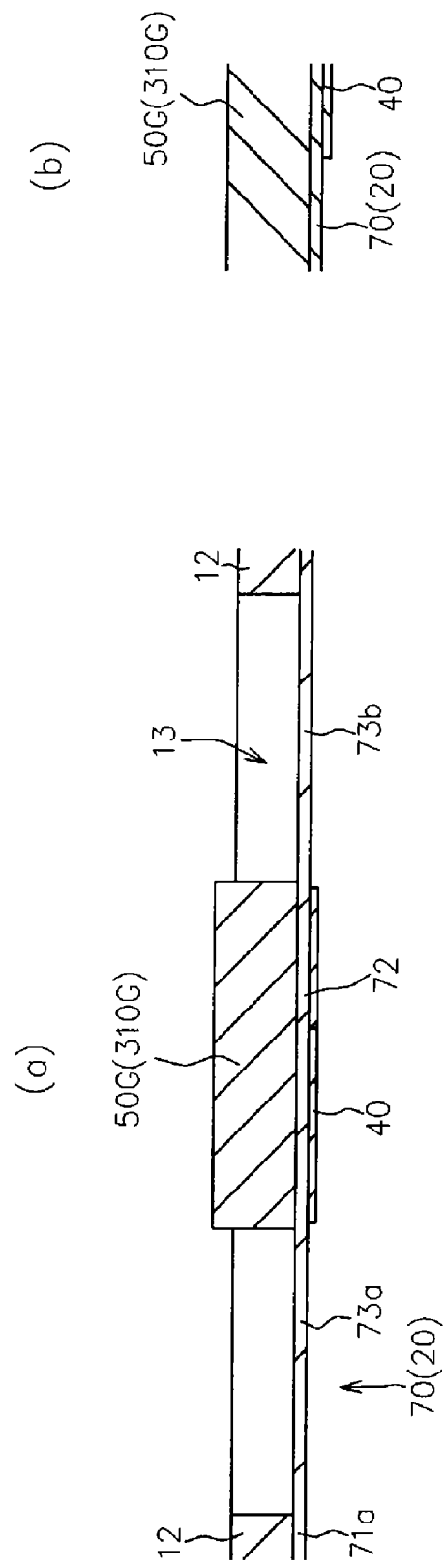
FIGS. 22A and 22B are cross sectional views respectively cut along Line XXII(a)-XXII(a) and Line XXII(b)-XXII(b) in FIG. 21A.

Further, FIGS. 22A and 22B are cross sectional views respectively cut along Line XXII(a)-XXII(a) and Line XXII(b)-XXII(b) that are indicated in FIG. 21A.

In the drawings, the components identical to those according to any of the first to sixth embodiments are denoted by the identical symbols, and detailed description thereof will not be repeated in the present embodiment.

The magnetic head suspension 1G according to the present embodiment includes, with the magnetic head suspension 1A according to the first embodiment as a reference, an equilibrating weight part 50G in place of the equilibrating weight part 50A, and a pair of first elastic plate parts 60G in place of the pair of first elastic plate parts 60.

As shown in FIGS. 21A and 21B, the equilibrating weight part 50G is configured by an equilibrating weight part component 310G that is provided separately from a load beam part component 300G configuring the load beam part, and is joined by welding to the load beam part component 300G.

In the present embodiment, the load beam part component 300G integrally has the pair of first elastic plate parts 60G and the second elastic plate part 70, in addition to the load beam part 30.

Accordingly, as in each of the embodiments already described, the load beam part component 300G is provided with the flanges 32 on both side edges of a region where the load beam part 30 is formed.

Similarly to the equilibrating weight part according to the second embodiment, the equilibrating weight part 50G has, in the suspension lengthwise direction, a central portion 52G that is joined to the second elastic plate part 70, a distal end portion 51G that is extended from the central portion 52G toward the distal end side and that is joined to the load beam part component 300G, and a proximal end portion 53G that is extended from the central portion 52G toward the proximal end side.

As shown in FIG. 21A, the distal end portion 51G has a region located outside the outmost end of the central portion 52G in the suspension widthwise direction, and is joined by welding to the load beam part component 300G.

As shown in FIGS. 21A and 21B, the pair of first elastic plate parts 60G have proximal ends connected respectively to the pair of support pieces 12 and free ends connected to the distal end portion 51G of the equilibrating weight part 50G.

The thus configured magnetic head suspension 1G makes it possible to increase the distance between support points at which the assembly is supported by the pair of first elastic plate parts 60G without further increase in width of the load beam part 30 beyond necessity.

Therefore, it is possible to increase rigidity of the assembly in the sway direction as well as in the twist direction, while preventing increase in weight of the load beam part 30.

Furthermore, in the present embodiment, the longitudinal direction of the pair of first elastic plate parts 60G can be aligned along the suspension lengthwise direction without increase in width of the load beam part 30. As a result, it is possible to stabilize the first pressing load that is generated by the pair of first elastic plate parts 60G.

As shown in FIG. 21A, the distal end portion 51G of the equilibrating weight part 50G in the present embodiment has a pair of beams 511G that are extended from the center in the suspension widthwise direction to right and left respectively, as in the second embodiment.

Preferably, as shown in FIG. 21A, the pair of beams 511G respectively have free ends that are extended outwards than the load beam part 30 in the suspension widthwise direction, and the free ends of the pair of first elastic plate parts 60G are connected to the pair of beams 511G at portions located outside the load beam part 30 in the suspension widthwise direction.

This configuration makes it possible to realize further increase in distance between the support points at which the assembly is supported by the pair of first elastic plate parts 60G, thereby further effectively increasing rigidity of the assembly in the sway direction and in the twist direction.

Eighth Embodiment

Described below with reference to the accompanying drawings is a magnetic head suspension according to an eighth embodiment of the present invention.

Figure 23:
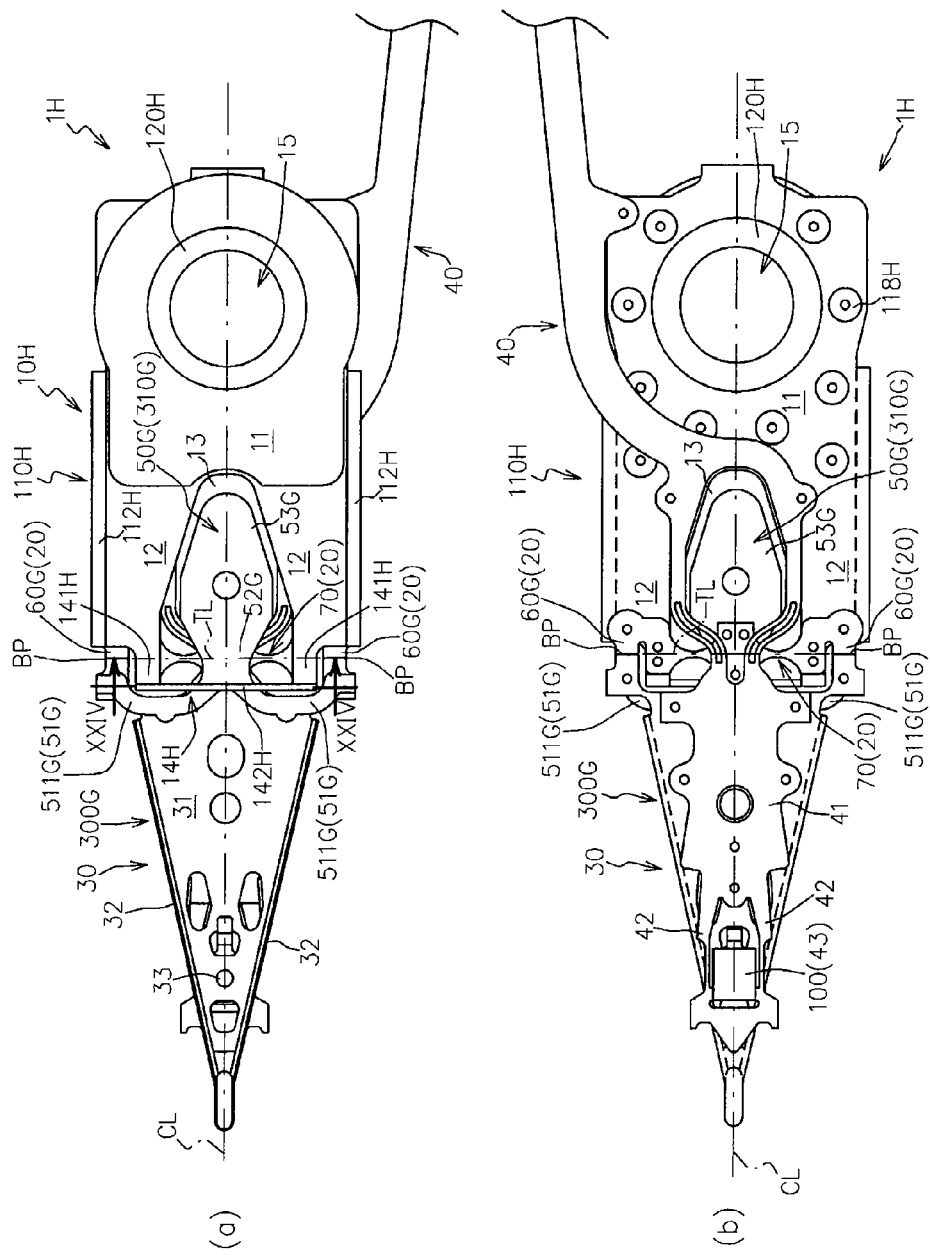
FIGS. 23A and 23B are a top view and a bottom view respectively, of a magnetic head suspension according to an eighth embodiment of the present invention.

FIGS. 23A and 23B are a top view (a plan view as viewed from the side opposite from the disk surface) and a bottom view (a bottom view as viewed from the side close to the disk surface) respectively, of a magnetic head suspension 1H according to the present embodiment. It is noted that small circles in FIG. 23B each indicate a welding point.

Figure 24:
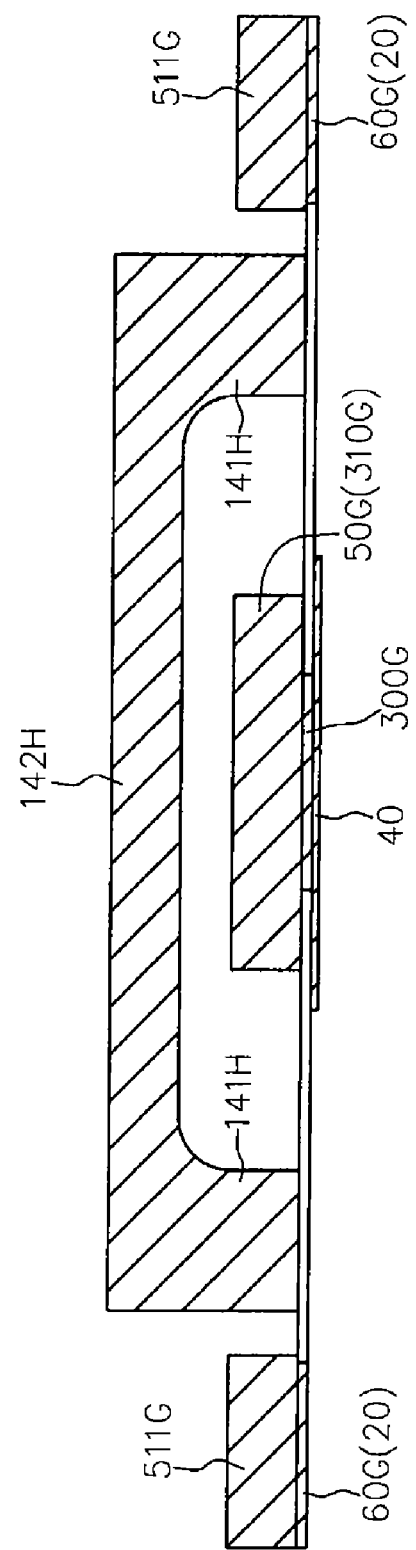
FIG. 24 is a cross sectional view cut along Line XXIV-XXIV in FIG. 23A.

Further, FIG. 24 is a cross sectional view cut along Line XXIV-XXIV that is indicated in FIG. 23A.

In the drawings, the components identical to those according to any of the first to seventh embodiments are denoted by the identical symbols, and detailed description thereof will not be repeated in the present embodiment.

The magnetic head suspension 1H according to the present embodiment includes a supporting part 10H that is provided with the pair of support pieces 12.

As in each of the third to sixth embodiments already described, the supporting part 10H integrally has a connecting piece 14H that connects the pair of support pieces 12 with each other on the side of the assembly that is opposite from the disk surface.

More specifically, the magnetic head suspension 1H includes the supporting part 10H, the pair of first elastic plate parts 60G, the second elastic plate part 70, the assembly that includes the load beam part 30 and the equilibrating weight part 50G and that is supported by the supporting part 10H through the pair of first elastic plate parts 60G and the second elastic plate part 70, and the flexure part 40 that is joined to the load beam part 30.

Figure 25:
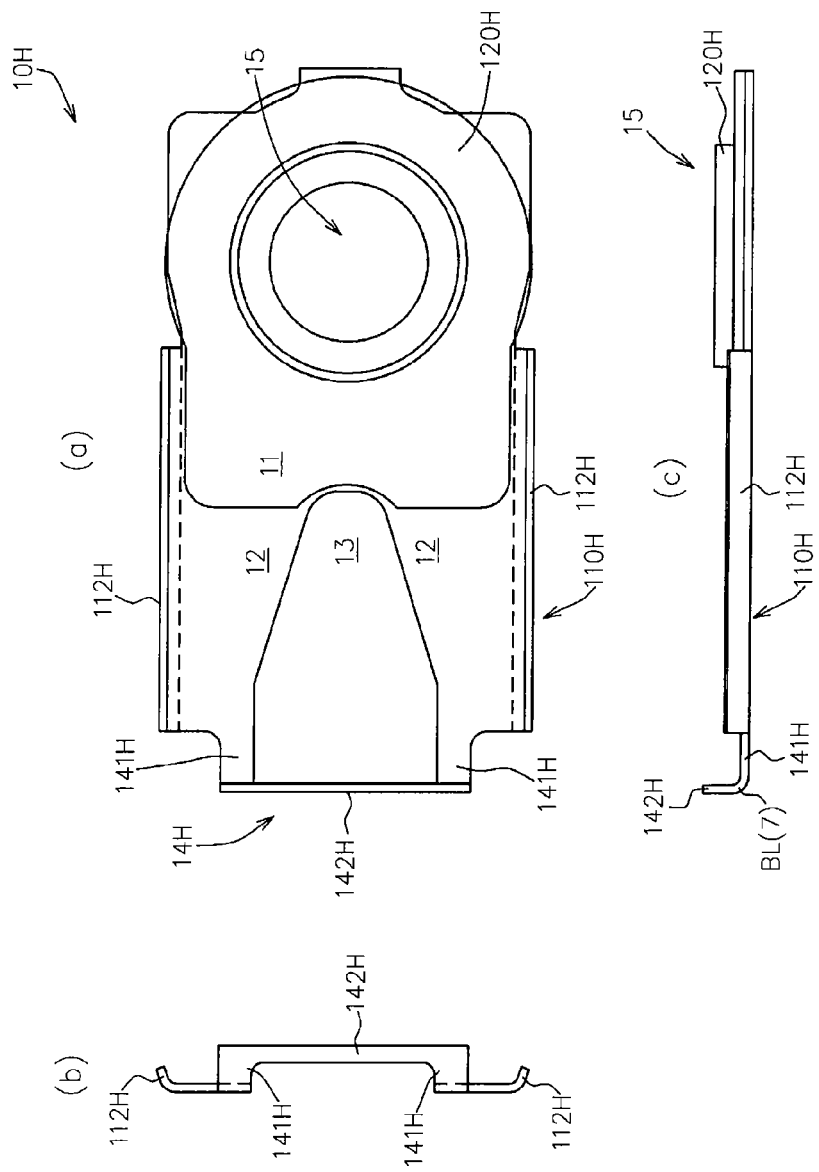
FIGS. 25A to 25C are a plan view, a front view and a side view of a supporting part in the magnetic head suspension according to the eighth embodiment, respectively.

FIGS. 25A to 25C are a plan view, a front view, and a side view of the supporting part 10H, respectively.

As shown in FIGS. 25A to 25C, the supporting part 10H integrally has the connecting piece 14H, in addition to the main body region 11 and the pair of support pieces 12.

The connecting piece 14H has a pair of arm regions 141H that have proximal ends connected respectively to the pair of support pieces 12 and distal ends extended respectively from the proximal ends toward the distal end side of the magnetic head suspension, and a bridge region 142H that connects the distal ends of the pair of arm regions 141H with each other.

In the connecting piece 14H, each of the pair of arm regions 141H is bent at only one point around a bending reference line BL(7) along the suspension widthwise direction, so that the bridge region 142H is located on the side of the assembly that is opposite from the disk surface. This configuration can facilitate fabrication of the connecting piece 14H that is integrally provided in the supporting part 10H.

Specifically, in each of the third to fifth embodiments where the connecting piece 14C or 14D is integrally provided in the supporting part 10C, 10D, or 10E, each of the connecting pieces 14C and 14D is bent at the proximal ends and the distal ends of the pair of arm regions 141C or 141D around the four bending reference lines BL(1) to BL(4) along the suspension lengthwise direction.

In the sixth embodiment where the connecting piece 14F is integrally provided in the supporting part 10F, the connecting piece 14F is bent at the proximal ends and the distal ends of the pair of arm regions 141F around the two bending reference lines BL(5) and BL(6) along the suspension widthwise direction.

On the contrary, the connecting piece 14H in the present embodiment is configured so that the bridge region 142H is located on the side of the assembly that is opposite from the disk surface by being bent at only intermediate parts between the proximal ends and the distal ends of the pair of arm regions 141H respectively around the one bending reference line BL(7) along the suspension widthwise direction.

Therefore, the thus configured present embodiment makes it possible to realize further facilitation in fabricating the connecting piece 14H in comparison to the second to sixth embodiments described above.

As shown in FIG. 24, in a state where the pair of arm regions 141H have been applied with bending fabrication, there is provided, between the bridge region 142H and the assembly, a space sized to allow the assembly to turn about the twist axis line TL when the magnetic head suspension 1H is in the operating condition.

The length of the space can be easily adjusted by displacing the bending reference line BL(7) in the suspension lengthwise direction.

Figure 26:
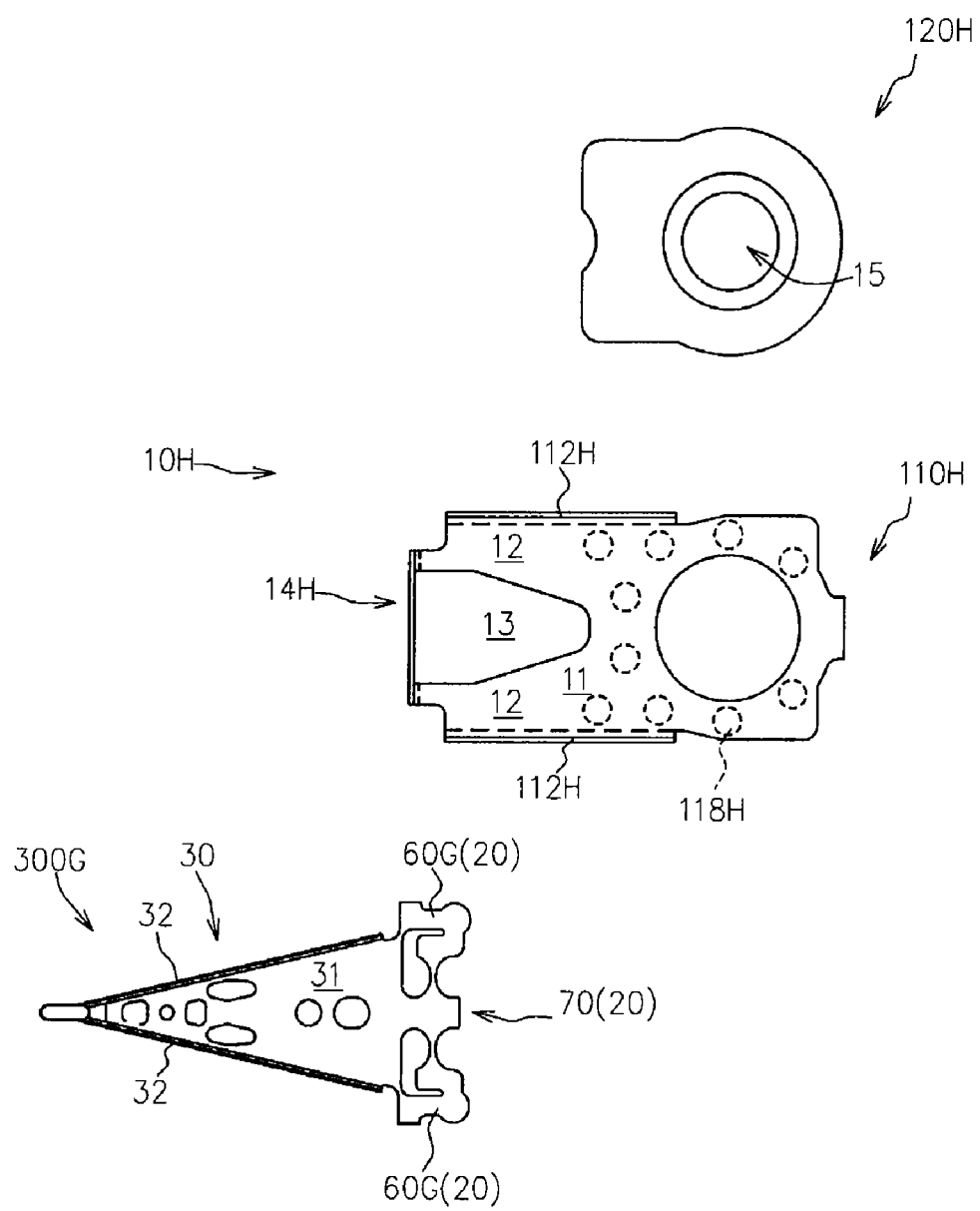
FIG. 26 is a partial exploded plan view of the magnetic head suspension according to the eighth embodiment.

FIG. 26 is an exploded plan view of the supporting part 10H as well as the load beam part component 300G.

As shown in FIG. 26, the supporting part 10H in the present embodiment is provided with a supporting part component plate 110H that integrally has the main body region 11, the pair of support pieces 12, and the connecting piece 14H, and a boss member 120H that has the boss part 15 and is joined by welding to the supporting part component plate 110H.

As shown in FIG. 26, the supporting part component plate 110H is preferably provided with thinner regions 118H that facilitate welding with the boss member 120H. The thinner regions 118H can be easily fabricated by etching or the like.

The supporting part component plate 110H is preferably made thinner in view of facilitation in bending fabrication of the connecting piece 14H. Accordingly, in the present embodiment, the supporting part component plate 110H is provided on both side edges thereof with flanges 112H, so as to secure rigidity of the supporting part 10H while reducing thickness thereof, as shown in FIG. 26.

Ninth Embodiment

Described below with reference to the accompanying drawings is a magnetic head suspension according to a ninth embodiment of the present invention.

Figure 27:
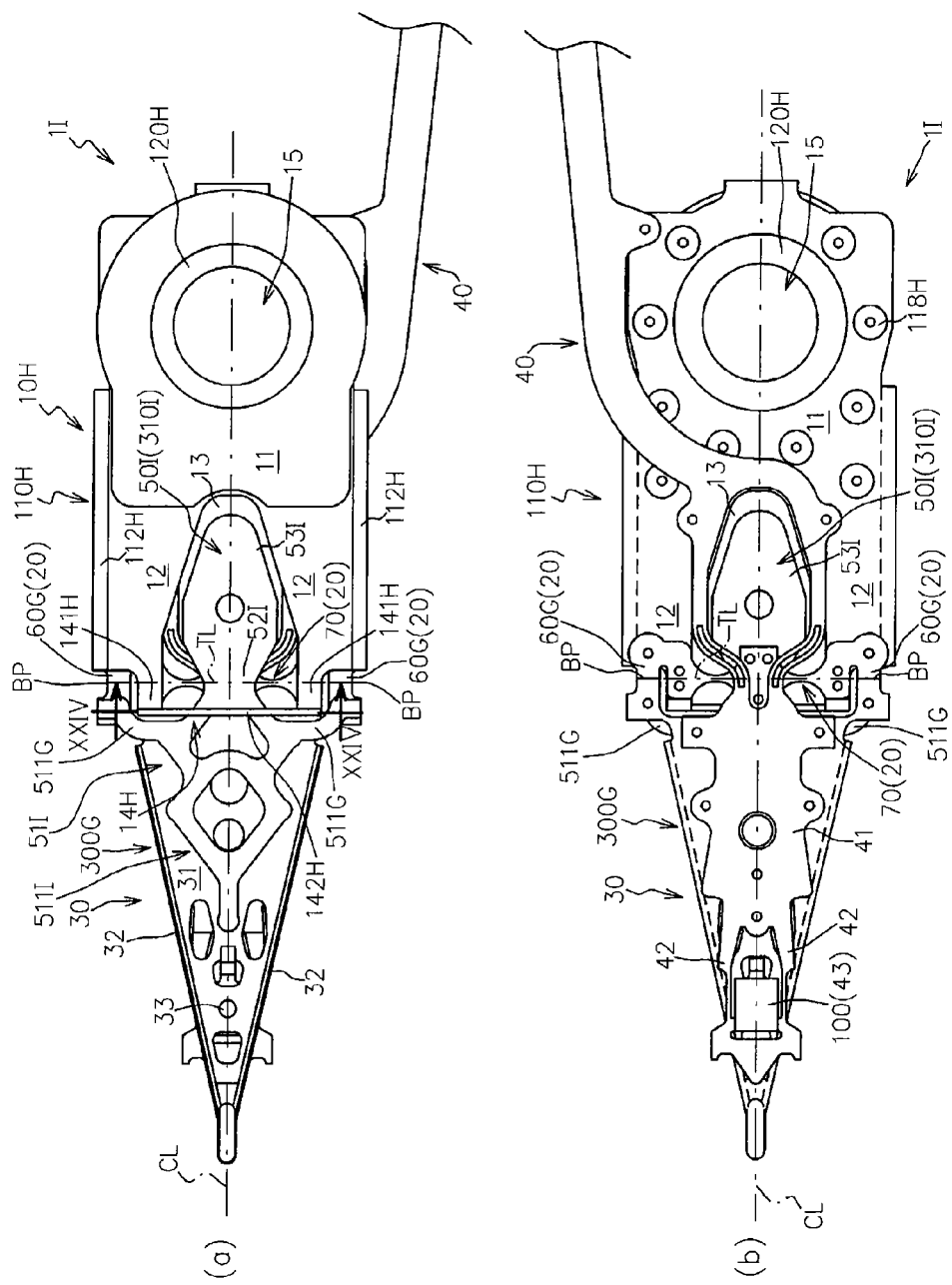
FIGS. 27A and 27B are a top view and a bottom view respectively, of a magnetic head suspension according to a ninth embodiment of the present invention.

FIGS. 27A and 27B are a top view (a plan view as viewed from the side opposite from the disk surface) and a bottom view (a bottom view as viewed from the side close to the disk surface) respectively, of a magnetic head suspension 1I according to the present embodiment. It is noted that small circles in FIG. 27B each indicate a welding point.

In the drawings, the components identical to those according to any of the first to eighth embodiments are denoted by the identical symbols, and detailed description thereof will not be repeated in the present embodiment.

The magnetic head suspension 1I according to the present embodiment is different from the magnetic head suspension according to each of the foregoing embodiments mainly in that there is provided an equilibrating weight part 50I having a shape different from those according to the foregoing embodiments.

More specifically, as in each of the embodiments already described, the equilibrating weight part 50I is configured by an equilibrating weight part component 310I that is provided separately from the load beam part component 300G configuring the load beam part 30, and is joined by welding to the load beam part component 300G.

The equilibrating weight part 50I has, in the suspension lengthwise direction, a central portion 52I that is joined to the second elastic plate part, a distal end portion 51I that is extended from the central portion 52I toward the distal end side and that is joined to the load beam part component 300G, and a proximal end portion 53I that is extended from the central portion 52I toward the proximal end side.

As shown in FIG. 27A, the distal end portion 51I is provided with the pair of beams 511G, and an additional beam 511I that is extended from the pair of beams 511G toward the distal end side in the suspension lengthwise direction so as to be overlapped with the load beam part 30 in planar view.

The pair of beams 511G and the additional beam 511I are joined by welding to the load beam part component 300G at appropriate positions.

The magnetic head suspension 1I thus configured can effectively increase rigidity of the load beam part 30, thereby raising the resonant frequency in the sway direction and in the twist direction.

Tenth Embodiment

Described below with reference to the accompanying drawings is a magnetic head suspension according to a tenth embodiment of the present invention.

Figure 28:
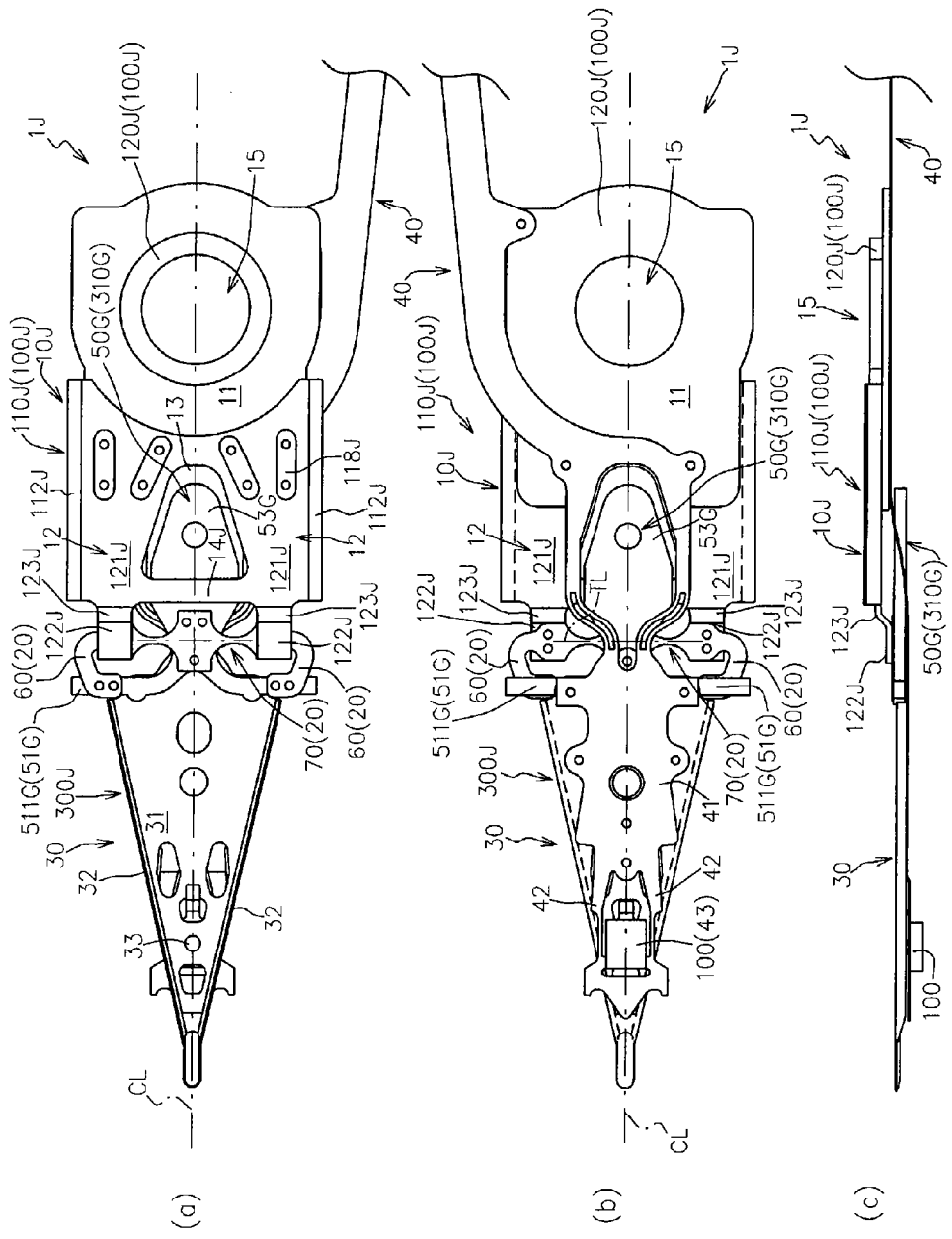
FIGS. 28A to 28C are a top view, a bottom view and a side view respectively, of a magnetic head suspension according to a tenth embodiment of the present invention.

FIGS. 28A to 28C are a top view (a plan view as viewed from the side opposite from the disk surface), a bottom view (a bottom view as viewed from the side close to the disk surface), and a side view, respectively, of a magnetic head suspension 1J according to the present embodiment. It is noted that small circles in FIGS. 28A and 28B each indicate a welding point.

In the drawings, the components identical to those according to any of the first to ninth embodiments are denoted by the identical symbols, and detailed description thereof will not be repeated in the present embodiment.

The magnetic head suspension 1J according to the present embodiment is different from the magnetic head suspension according to each of the foregoing embodiments mainly in that there is provided a supporting part 10J having a shape different from those according to the foregoing embodiments.

Figure 29:
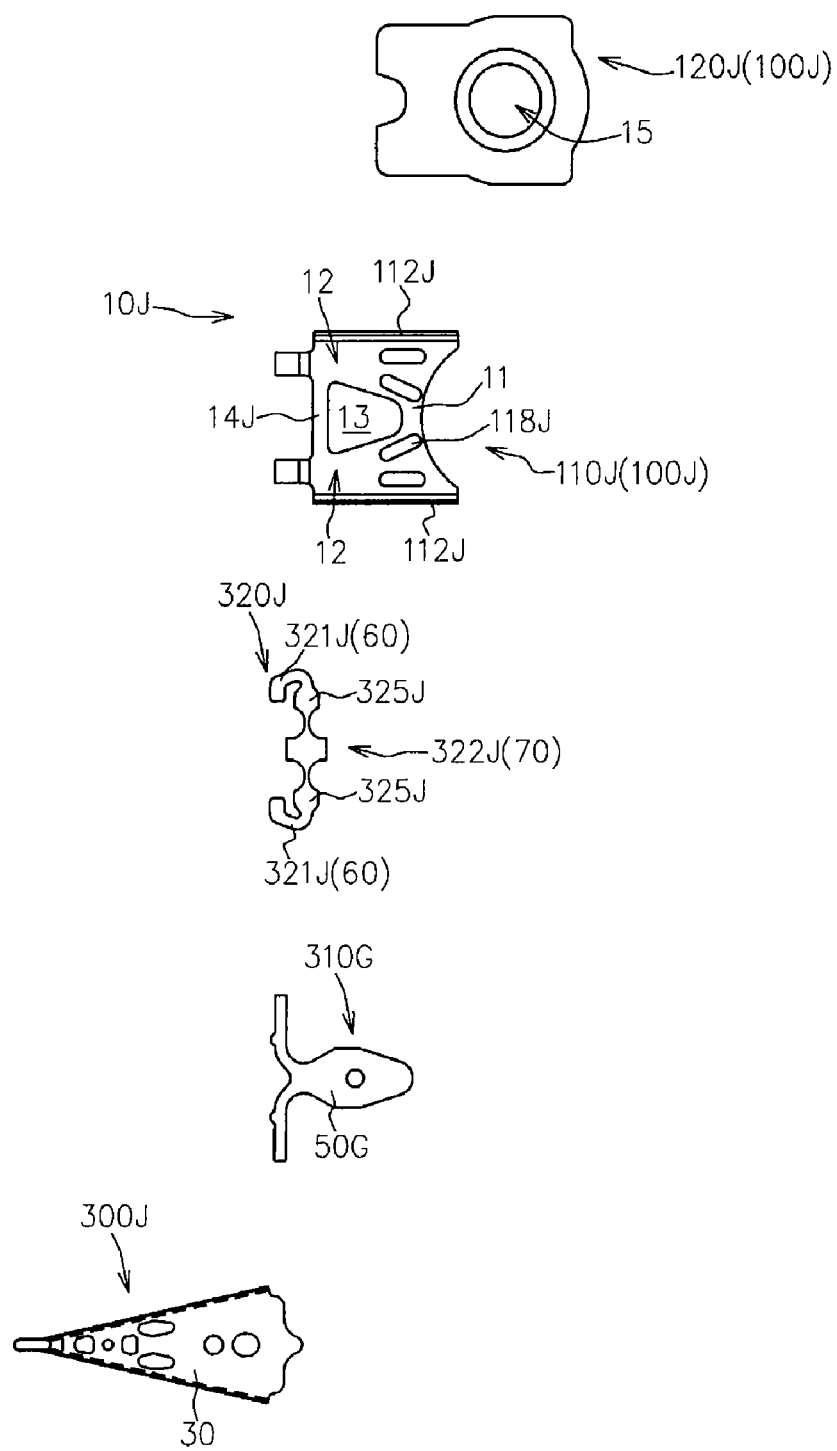
FIG. 29 is an exploded plan view of the magnetic head suspension according to the tenth embodiment.

FIG. 29 is an exploded plan view of the magnetic head suspension 1J.

As shown in FIGS. 28A to 28C and 29, the supporting part 10J is provided with the main body region 11, a pair of support pieces 12J that are extended from both ends in the suspension widthwise direction of the distal end of the main body region 11 toward the distal end side, and a connecting piece 14J that is located in a plane identical with the main body region 11 and connects the pair of support pieces 12J with each other.

The pair of support pieces 12J have a pair of first planar portions 121J that are located in a plane identical with the main body region 11 and that are connected with each other by the connecting piece 14J, a pair of second planar portions 122J that are located closer to the disk surface relative to the pair of first planar portions 121J and that are extended substantially in parallel with the disk surface, and a pair of arm portions 123J that respectively connect the pair of first planar portions 121J and the pair of second planar portions 122J with each other.

The pair of second planar portions 122J support the assembly through the pair of first elastic plate parts 60 and the second elastic plate part 70.

More specifically, the pair of first elastic plate parts 60 have the proximal ends respectively connected to the pair of second planar portions 122J and the free ends respectively connected to the assembly.

The second elastic plate part 70 has the first and second ends respectively connected to the pair of second planar portions 122J and the central part, between the first and the second ends, connected to the assembly.

In the magnetic head suspension 1J thus configured, the assembly inclusive of the load beam part 30 and the equilibrating weight part 50G is supported by the supporting part 10J through the pair of first elastic plate parts 60 and the second elastic plate part 70. Therefore, as in each of the embodiments already described, it is possible to realize a rise in resonant frequency as well as improvement in impact resistance.

Further, as the assembly is supported by the pair of second planar portions 122J that are located closer to the disk surface relative to the main body region 11, it is possible to secure a space in the direction orthogonal to the disk surface between the assembly and the connecting piece 14J that is located in the plane identical with the main body region 11.

Therefore, it is possible to effectively prevent the connecting piece 14J from interfering with the assembly when the assembly turns about the twist axis line TL at the operating condition of the magnetic head suspension 1J, while increasing rigidity of the supporting part 10J by provision of the connecting piece 14J. Further, provision of the connecting piece 14J can effectively prevent significant displacement of the assembly in a direction of moving away from the disk surface upon application of an impact force, so that effectively inhibited is jumping action of the magnetic head slider 100.

As shown in FIG. 29, the magnetic head suspension 1J according to the present embodiment includes a load beam part component 300J that configures the load beam part 30, the equilibrating weight part component 310G that configures the equilibrating weight part 50G, a load bending part component 320J that integrally has the pair of first elastic plate parts 60 and the second elastic plate part 70, and a supporting part component 100J that configures the supporting part 10J.

The load beam part component 300J and the equilibrating weight part component 310G are provided separately from each other, and are joined by welding to each other so as to configure the assembly.

The load bending part component 320J is provided separately from the load beam part component 300J, the equilibrating weight part component 310G, and the supporting part component 100J.

More specifically, the load bending part component 320J is provided with a pair of supporting part joining regions 325J that are joined by welding to the pair of second planar portions 122J in the supporting part 10J, a pair of first elastic plate part configuring regions 321J that are extended from the pair of supporting part joining regions 325J toward the distal end side in the suspension lengthwise direction and that configure the pair of first elastic plate parts 60, and a second elastic plate part configuring region 322J that is extended between the pair of supporting part joining regions 325J so as to follow the suspension widthwise direction and that configures the second elastic plate part 70.

As shown in FIG. 29, the supporting part component 100J in the present embodiment is provided with a supporting part component plate 110J that integrally has the main body region 11, the pair of support pieces 12, and the connecting piece 14J, and a boss member 120J that is joined by welding to the supporting part component plate 110J so as to configure the boss part 15, in order to facilitate bending fabrication of the pair of support pieces 12.

This configuration makes it possible to facilitate bending fabrication of the pair of support pieces 12 by reduction in thickness of the supporting part component plate 110J, while securing rigidity of the supporting part 10J by provision of the boss member 120J.

The supporting part component plate 110J is preferably provided with flanges 112J on both side edges thereof, so as to further increase rigidity of the supporting part 10J without increase in thickness of the supporting part component plate 110J.

FIG. 29 further illustrates thinner regions 118J that are provided in the supporting part component plate 110J in order to facilitate welding between the supporting part component plate 110J and the boss member 120J.

Eleventh Embodiment

Described below with reference to the accompanying drawings is a magnetic head suspension according to an eleventh embodiment of the present invention.

Figure 30:
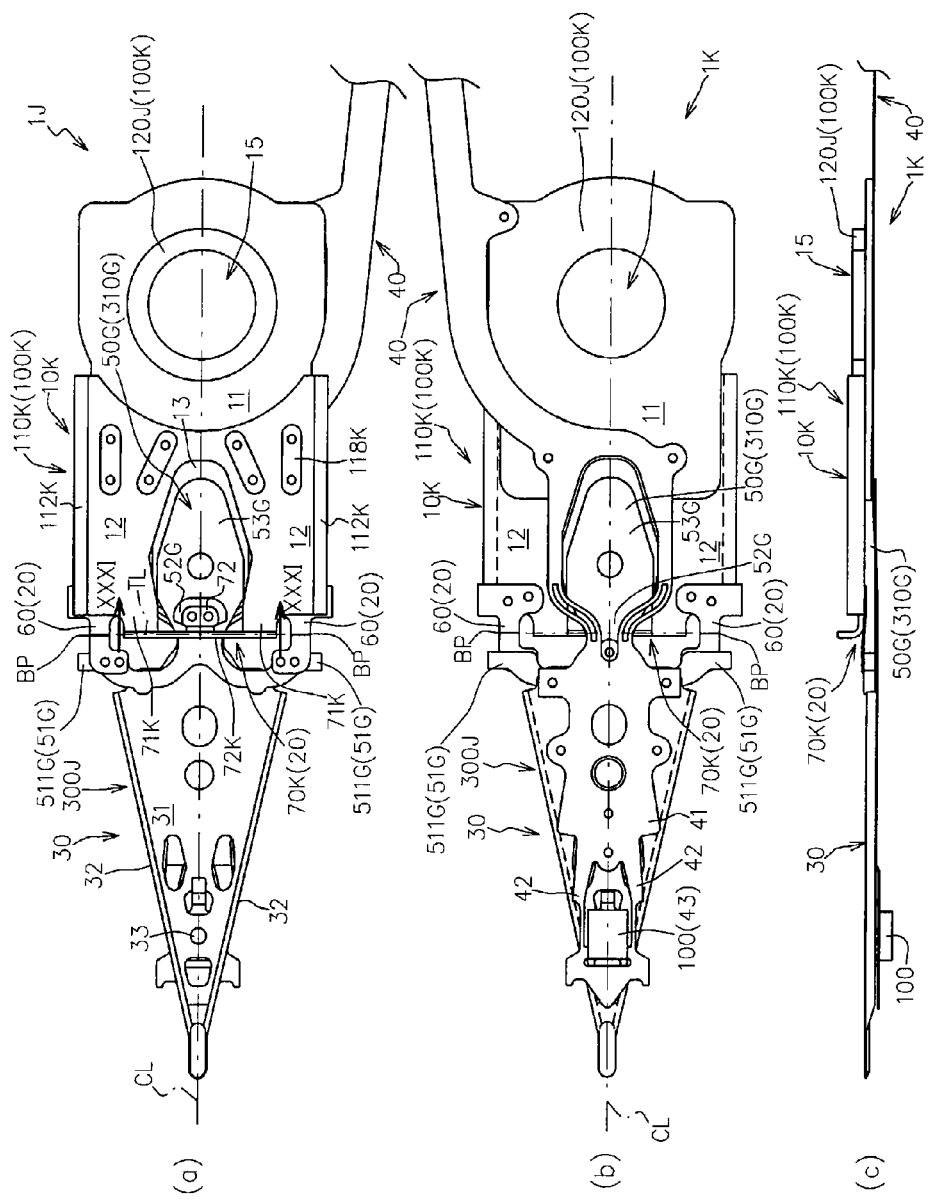
FIGS. 30A to 30C are a top view, a bottom view and a side view respectively, of a magnetic head suspension according to an eleventh embodiment of the present invention.

FIGS. 30A to 30C are a top view (a plan view as viewed from the side opposite from the disk surface), a bottom view (a bottom view as viewed from the side close to the disk surface), and a side view, respectively, of a magnetic head suspension 1K according to the present embodiment. It is noted that small circles in FIGS. 30A and 30B each indicate a welding point.

Figure 31:
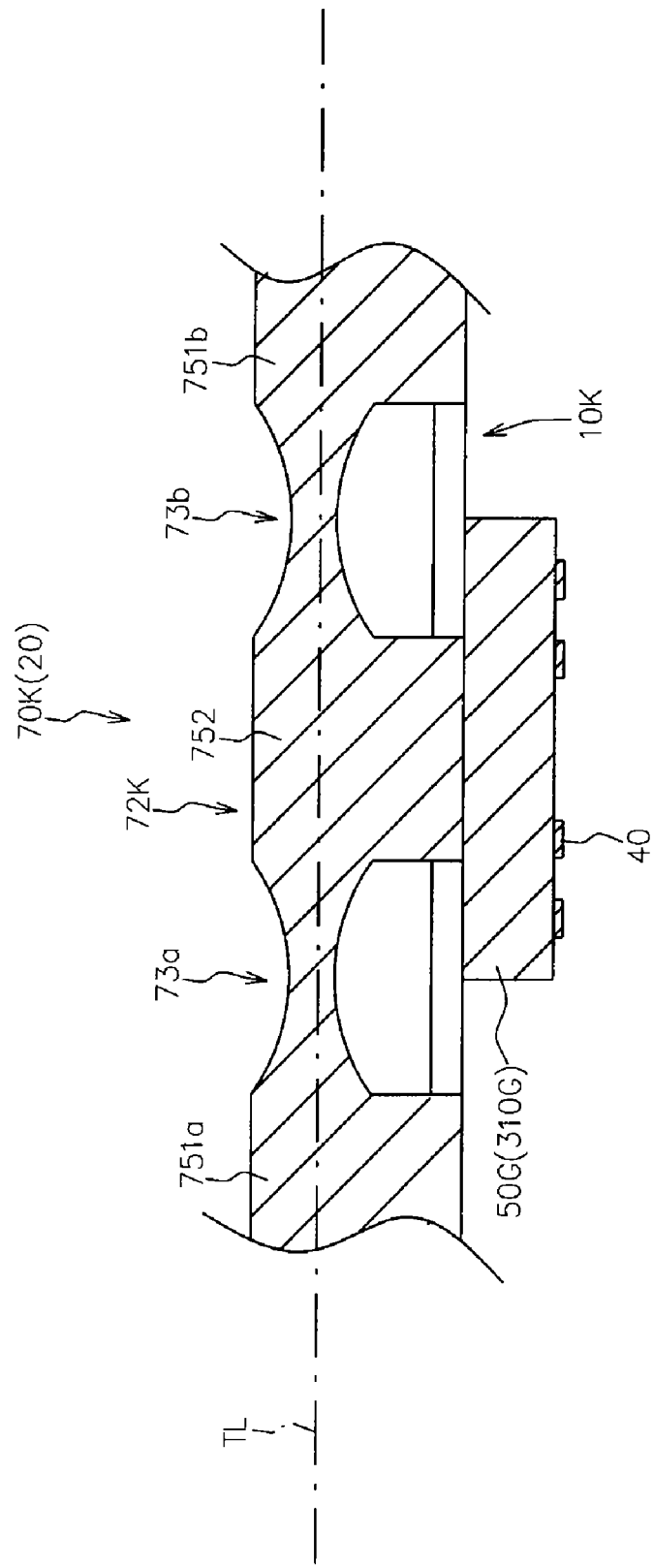
FIG. 31 is a cross sectional view cut along Line XXXI-XXXI in FIG. 30A.

Further, FIG. 31 is a cross sectional view cut along Line XXXI-XXXI that is indicated in FIG. 30A.

In the drawings, the components identical to those according to any of the first to tenth embodiments are denoted by the identical symbols, and detailed description thereof will not be repeated in the present embodiment.

In each of the foregoing embodiments, the pair of extended regions 73a and 73b included in the second elastic plate part 70 have plate surfaces substantially in parallel with the disk surface.

On the contrary, the magnetic head suspension 1K according to the present embodiment includes a second elastic plate part 70K that has the pair of extended regions 73a and 73b of which plate surfaces are substantially orthogonal to the disk surface.

More specifically, the second elastic plate part 70K has a pair of support piece connecting regions that have plate surfaces substantially in parallel with the disk surface and that are connected respectively to the pair of support pieces 12, a pair of arm pieces 71K that are extended from the pair of support piece connecting regions toward the distal end side in the suspension lengthwise direction so as to have plate surfaces substantially in parallel with the disk surface, and a connecting piece 72K that connects distal ends of the pair of arm pieces 71K with each other. The pair of arm pieces 71K are each bent at an intermediate position between the proximal end and the distal end thereof, so that the connecting piece 72K has a plate surface substantially orthogonal to the disk surface.

As shown in FIGS. 30A and 31, the connecting piece 72K is provided with a pair of end regions 751a and 751b that are located at positions corresponding to the pair of support piece connecting regions in the suspension widthwise direction and that have plate surfaces substantially orthogonal to the disk surface, a central region 752 that is located substantially in a center in the suspension widthwise direction in a state of having a plate surface substantially orthogonal to the disk surface, the pair of extended regions 73a and 73b that are extended from the central region 752 to the pair of end regions 751a and 751b respectively in a state of having the plate surfaces substantially orthogonal to the disk surface, and an assembly connecting region 72 that is bent from an edge of the central region 752 on a side closer to the disk surface so as to have a plate surface substantially in parallel with the disk surface and that is connected to the assembly.

Figure 32:
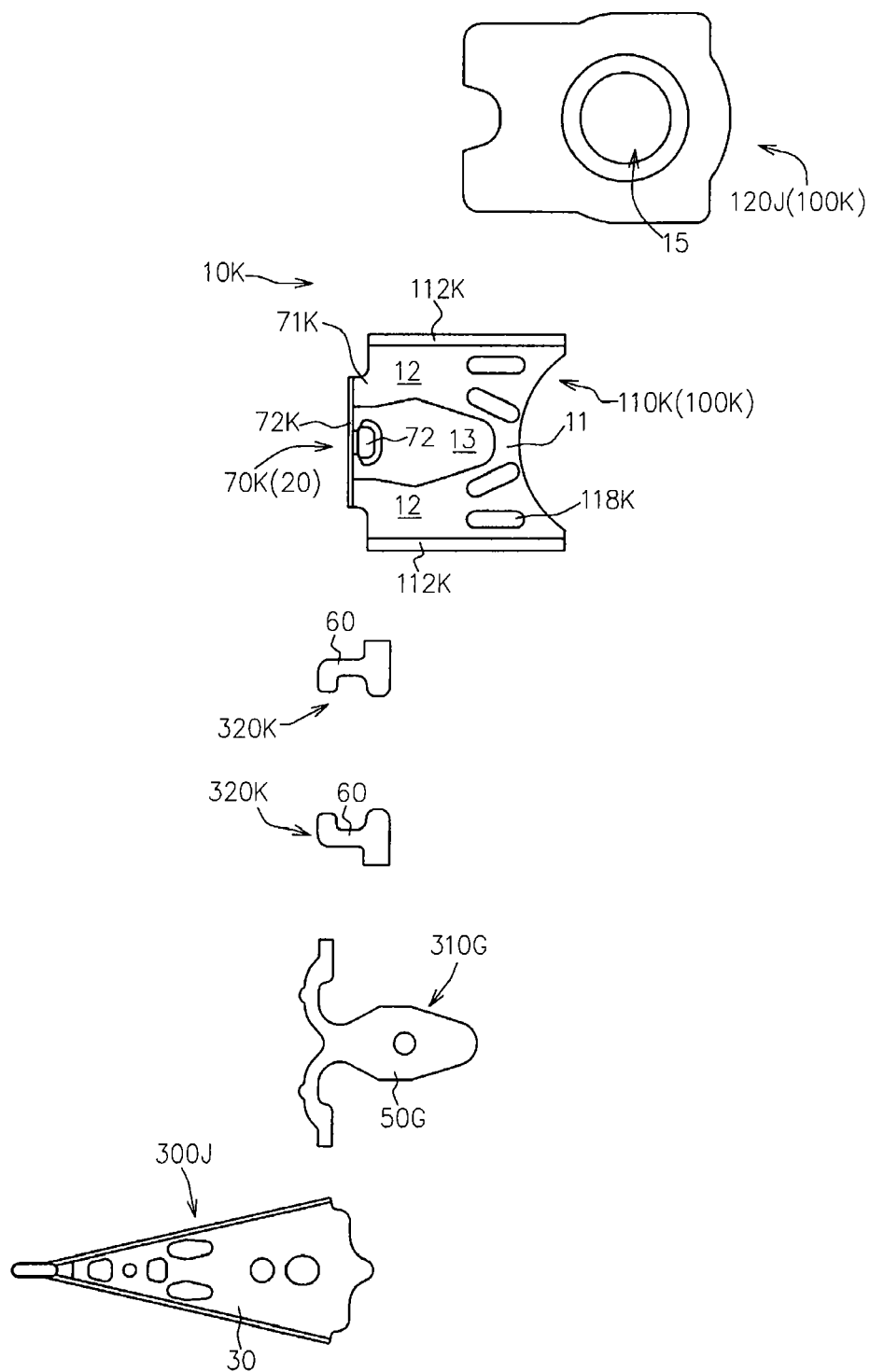
FIG. 32 is an exploded plan view of the magnetic head suspension according to the eleventh embodiment.

FIG. 32 is an exploded plan view of the magnetic head suspension 1K.

As shown in FIG. 32, the magnetic head suspension 1K includes a supporting part 10K that is formed integrally with the second elastic plate part 70K.

The supporting part 10K is provided with the main body region 11, the pair of support pieces 12, and the second elastic plate part 70K that is formed integrally with the pair of support pieces 12.

In the above configuration, the pair of support pieces 12 included in the supporting part 10K function as the pair of support piece connecting regions.

The pair of extended regions 73a and 73b have the plate surfaces substantially orthogonal to the disk surface, and are elastically twisted around the twist axis line TL so as to generate the second pressing load that presses the magnetic head suspension 100 toward the disk surface against air pressure due to rotation of the disk.

As shown in FIGS. 30A and 32, the assembly connecting region 72 is substantially in parallel with the disk surface, and has a facing surface that faces the disk surface and that is joined by welding to the rear surface of the assembly (the equilibrating weight part 50G in the illustrated mode) that is opposite from the disk surface.

As in each of the embodiments described above, the magnetic head suspension 1K thus configured realizes a rise in resonant frequency in the sway direction and in the twist direction as well as improvement in impact resistance.

Moreover, in the present embodiment, as described above, the portion in of the connecting piece 72K of the second elastic plate part 70K that is other than the assembly connecting region 72 connects the pair of support pieces 12 with each other in a state of being substantially orthogonal to the disk surface on the rear surface side of the assembly that is opposite from the disk surface, and the assembly connecting region 72 of the connecting piece 72K is joined to the rear surface of the assembly that is opposite from the disk surface.

In this configuration, the second elastic plate part 70K not only generates the second pressing load but also prevents the assembly from being displaced in the direction away from the disk surface upon application of an impact force. Therefore, effectively suppressed is the amount of jumping action of the magnetic head when an impact force is applied.

As shown in FIG. 32, in the present embodiment, the load beam part 30 is configured by the load beam part component 300J, and the pair of first elastic plate parts 60 are configured by a pair of first elastic plate part components 320K.

Alternatively, the load beam part 30 and the pair of first elastic plate parts 60 can be configured integrally by a single member.

As shown in FIG. 32, in the present embodiment, a supporting part component 100K configuring the supporting part 10K is provided with a supporting part component plate 110K that integrally has the main body region 11, the pair of support pieces 12 and the second elastic plate part 70K, and a boss member 120J that is joined by welding to the supporting part component plate 110K and that configures the boss part 15.

This configuration makes it possible to facilitate bending fabrication of the second elastic plate part 70K by reduction in thickness of the supporting part component plate 110K, while securing rigidity of the supporting part 10K by provision of the boss member 120J.

The supporting part component plate 110K is preferably provided with flanges 112K on both side edges thereof, so as to further increase rigidity of the supporting part 10K without increase in thickness of the supporting part component plate 110K.

FIGS. 30A and 32 further illustrate thinner regions 118K that are provided in the supporting part component plate 110K in order to facilitate welding between the supporting part component plate 110K and the boss member 120J.

This specification is by no means intended to restrict the present invention to the preferred embodiment and the modified embodiment set forth therein. Various modifications to the suspension for supporting the magnetic head slider may be made by those skilled in the art without departing from the spirit and scope of the present invention as defined in the appended claims.

What is claimed is:

1. A magnetic head suspension comprising a load bending part that generates a load for pressing a magnetic head slider toward a disk surface, a load beam part that transmits the load to the magnetic head slider, a supporting part that supports the load beam part through the load bending portion and that includes a main body region and a pair of support pieces extended from both ends of the main body region in a suspension widthwise direction toward a distal end side of the suspension so as to define a concave part therebetween opened toward the distal end side of the suspension at a center in the suspension width direction, a flexure part that is joined to the load beam part and that supports the magnetic head slider, and an equilibrating weight part that is connected to the load beam part so as to have a proximal end located within the concave part in planar view and that forms, together with the load beam part, the flexure part and the magnetic head slider, an assembly supported by the supporting part through the load bending part, wherein
 (a) there is provided a pair of first elastic plate parts disposed symmetrically with each other with a longitudinal center line of the suspension as a reference and a second elastic plate part disposed symmetrically with the longitudinal center line as a reference, the pair of first elastic plate parts and the second elastic plate part functioning as the load bending part,
 (b) the pair of first elastic plate parts have proximal ends connected to the pair of support pieces and free ends connected to the assembly in a state of having plate surfaces substantially in parallel with the disk surface, the pair of first elastic plate parts being elastically deformed in a bended manner so as to generate a first pressing load that presses the magnetic head slider toward the disk surface against air pressure due to rotation of the disk surface,
 (c) the second elastic plate part is positioned between the pair of first elastic plate parts in the suspension widthwise direction in a state of having its longitudinal direction along the suspension widthwise direction,
 (d) the second elastic plate part includes a pair of support piece connecting regions that are respectively connected to the pair of support pieces, an assembly connecting region that is positioned at a center of the second elastic plate part in its longitudinal direction and that is connected to the assembly, and a pair of extended regions that are extended between the support piece connecting regions and the assembly connecting region, the second elastic plate part generating a second pressing load that presses the magnetic head slider toward the disk surface against air pressure due to rotation of the disk surface as the pair of extended regions are elastically deformed in a twisted manner around a twist axis line along the suspension widthwise direction, and
 (e) the total of the first and second pressing loads functions as the load for pressing the magnetic head slider toward the disk surface.

2. A magnetic head suspension according to claim 1, wherein the pair of first elastic plate parts are pre-bent at a position same as the twist axis line of the second elastic plate part in the suspension lengthwise direction in such a manner that the free ends are closer to the disk surface relative to the proximal ends.

3. A magnetic head suspension according to claim 1, further comprising a single plate-like load beam part component, wherein
 the load beam part, the pair of first elastic plate parts and the second elastic plate part are integrally formed by the load beam part component, and
 a region of the load beam part component that forms the load beam part is provided with flanges.

4. A magnetic head suspension according to claim 1, further comprising an equilibrating weight part component that forms the equilibrating weight part, wherein
 the equilibrating weight part component is provided separately from the load beam part component, and is joined by welding to the load beam part component in a state of having a distal end portion overlapped with the region of the load beam part component that forms the load beam part with respect to the suspension lengthwise direction.

5. A magnetic head suspension according to claim 4, wherein
 the equilibrating weight part component includes, in the suspension lengthwise direction, a central portion joined to the second elastic plate part, the distal end portion extended from the central portion toward the distal end side of the suspension and joined to the load beam part component, and a proximal end portion that is extended from the central portion toward the proximal end side of the suspension, and
 the distal end portion is joined to the load beam part component in a state of being positioned outward from the central portion in the suspension widthwise direction and being overlapped with the load beam part in the suspension lengthwise direction.

6. A magnetic head suspension according to claim 5, wherein the distal end portion includes a pair of beams that are extended to right and left respectively from the center in the suspension widthwise direction.

7. A magnetic head suspension according to claim 6, wherein the pair of first elastic plate parts have the proximal ends connected to the pair of support pieces and the free ends connected to the pair of beams.

8. A magnetic head suspension according to claim 7, wherein
 the pair of beams have free ends extended outwards than the load beam part in the suspension widthwise direction, and
 the free ends of the pair of first elastic plate parts are connected to regions of the pair of beams that are positioned outward from the load beam part in the suspension widthwise direction.

9. A magnetic head suspension according to claim 1, wherein
 the supporting part includes a connecting piece that connects between the pair of support pieces,
 the connecting piece includes a pair of arm regions that have proximal ends connected respectively to the pair of support pieces and distal ends located farther away from the disk surface relative to the proximal ends, and a bridge region that connects between the distal ends of the pair of arm regions, and
 the bridge region connects between the pair of arm regions in a state of being overlapped in planar view with the twist axis line and being away from a rear surface of the assembly that is opposite from the disk surface in a direction orthogonal to the disk surface by a predetermined distance.

10. A magnetic head suspension according to claim 1, wherein
 the supporting part includes a connecting piece that connects between the pair of support pieces,
 the connecting piece includes a pair of arm regions that have proximal ends connected respectively to the pair of support pieces and distal ends located farther away from the disk surface relative to the proximal ends, and a bridge region that connects between the distal ends of the pair of arm regions,
 the bridge region connects between the pair of arm regions at a position overlapped in planar view with the twist axis line, and the bridge region is brought into contact with a rear surface of the assembly that is opposite from the disk surface through a contact structure, the contact structure being located at a substantially identical position with the twist axis line in the suspension lengthwise direction and being formed symmetrically with the longitudinal center line of the suspension as a reference.

11. A magnetic head suspension according to claim 9, wherein
the supporting part is configured by a base plate that includes a boss part provided with a boss hole to be joined by swaging to a distal end of an arm of an E block,
the base plate includes a first plate member that integrally has a region corresponding to the main body region, the pair of support pieces and the connecting piece, and a boss member that forms the boss part,
the first plate member is formed with a first mounting hole having a diameter corresponding to an outer diameter of the boss member, and a slit communicating the concave part defined by the pair of support pieces with the first mounting hole, and
the boss member is joined by welding to the first plate member in a state of being fitted into the first mounting hole.

12. A magnetic head suspension according to claim 11, wherein
the boss member includes a main body part that is provided with the boss hole and has an outer diameter slightly smaller than the diameter of the first mounting hole, and a caulk piece that is extended radially outwards from the main body part and has an outer diameter slightly larger than the diameter of the first mounting hole, and
the boss member is fitted into the first mounting hole in a state where the caulk piece is caulked therein.

13. A magnetic head suspension according to claim 11, wherein
the load beam part component integrally includes a supporting part configuring region corresponding to a region of the supporting part exclusive of the connecting piece, in addition to a region corresponding to the load beam part, a region corresponding to the pair of first elastic plate parts and a region corresponding to the second elastic plate part,
the supporting part configuring region is provided with a second mounting hole having a diameter larger than that of the boss hole, and
the first plate member is joined by welding to the rear surface of the load beam part component that is opposite from the disk surface in a state where the first mounting hole is positioned concentrically with the second mounting hole.

14. A magnetic head suspension according to claim 13, wherein
the second mounting hole has a diameter smaller than the outer diameter of the boss member, and
the boss member is fitted into the first mounting hole in a state where a part of its facing surface that faces the disk surface is in contact with the rear surface of the load beam part component that is opposite from the disk surface.

15. A magnetic head suspension according to claim 9, further comprising a supporting part component that forms the supporting part,
the supporting part component integrally includes the main body region, the pair of support pieces and the connecting piece, and
the pair of arm regions of the connecting piece are bent at the proximal ends and the distal ends around bending reference lines along the suspension widthwise direction, so that the bridge region is positioned on the side of the assembly that is opposite from the disk surface.

16. A magnetic head suspension according to claim 15, wherein
the supporting part component includes first and second supporting part component plates that are layered and joined by welding to each other,
the first supporting part component plate integrally includes a region corresponding to the main body region and a region corresponding to the pair of support pieces, and
the second supporting part component plate integrally includes a region corresponding to the main body region, a region corresponding to the pair of support pieces and a region corresponding to the connecting piece.

17. A magnetic head suspension according to claim 1, wherein
the supporting part integrally includes, in addition to the main body region and the pair of support pieces, a connecting piece that connects between the pair of support pieces,
the connecting piece includes a pair of arm regions that have proximal ends connected respectively to the pair of support pieces and distal ends extended from the proximal ends toward the distal end side of the suspension, and a bridge region that connects between distal ends of the pair of arm regions, and
the pair of arm regions are bent around bending reference lines along the suspension widthwise direction so that the bridge region is positioned on the side of the assembly that is opposite from the disk surface.

18. A magnetic head suspension according to claim 1, wherein
the pair of support pieces have a pair of first planar portions that are extended from the main body region to the distal end side of the suspension so as to be located in a plane identical with the main body region, a pair of second planar portions that are extended substantially in parallel with the disk surface at a position closer to the disk surface relative to the pair of first planar portions and that support the assembly through the pair of first elastic plates and the second elastic plate, and a pair of arm portions that connect between the pair of first planar portions and the pair of second planar portions,
the supporting part integrally includes, in addition to the main body region and the pair of support pieces, a connecting piece that connects between the pair of first planar portions on a side of the assembly that is opposite from disk surface.

19. A magnetic head suspension according to claim 1, wherein
the pair of extended regions of the second elastic plate part have plate surfaces substantially in parallel with the disk surface.

20. A magnetic head suspension according to claim 1, wherein
the pair of extended regions of the second elastic plate part have plate surfaces substantially orthogonal to the disk surface.

* * * * *